United States Patent [19]
Koyama

[11] Patent Number: 5,857,366
[45] Date of Patent: Jan. 12, 1999

[54] METHOD OF BENDING WORKPIECE TO TARGET BENDING ANGLE ACCURATELY AND PRESS BRAKE FOR USE IN THE SAME METHOD

[75] Inventor: Junichi Koyama, Kanagawa, Japan

[73] Assignee: Amada Company, Ltd., Kanagawa, Japan

[21] Appl. No.: 765,170
[22] PCT Filed: Jul. 7, 1995
[86] PCT No.: PCT/JP95/01358
§ 371 Date: Jun. 4, 1997
§ 102(e) Date: Jun. 4, 1997
[87] PCT Pub. No.: WO96/01706
PCT Pub. Date: Jan. 25, 1996

[30] Foreign Application Priority Data

Jul. 8, 1994 [JP] Japan .................................. 6-157277
Nov. 30, 1994 [JP] Japan .................................. 6-297229

[51] Int. Cl.⁶ .................................................. B21D 5/02
[52] U.S. Cl. ........................... 72/31.1; 72/17.3; 72/21.5; 72/389.3; 72/389.5
[58] Field of Search ................... 72/17.3, 31.1, 72/21.5, 702, 389.3, 389.5

[56] References Cited

U.S. PATENT DOCUMENTS

| | | |
|---|---|---|
| 3,824,822 | 7/1974 | Richardson . |
| 3,826,119 | 7/1974 | Marotto . |
| 3,874,205 | 4/1975 | Roch et al. . |
| 4,115,859 | 9/1978 | Brisk et al. . |
| 4,148,203 | 4/1979 | Farazandeh et al. . |

(List continued on next page.)

FOREIGN PATENT DOCUMENTS

| | | | |
|---|---|---|---|
| 3441113 | 5/1986 | Germany . | |
| 57-100820 | 6/1982 | Japan . | |
| 1-228612 | 9/1989 | Japan .................................. | 72/702 |
| 3-54013 | 8/1991 | Japan . | |
| 4108917 | 9/1992 | Japan . | |
| 4251614 | 9/1992 | Japan . | |
| 5-57353 | 3/1993 | Japan .................................. | 72/702 |
| 6-26226 | 2/1994 | Japan . | |
| 6-154877 | 6/1994 | Japan .................................. | 72/702 |
| 6-262264 | 9/1994 | Japan .................................. | 72/31.1 |
| 2041802 | 9/1980 | United Kingdom . | |

OTHER PUBLICATIONS

An English Language Abstract of JP 57–100820.
An English Language Abstract of JP 6–26226.
Patent Abstracts of Japan with JP 4–251614.
E. Hänni et al., "Das Dreipunktbiegeverfahren", *Fertigung*, Jun. 3, 1976, together with an English translation.
S. Kuwada, "Japan Mechanical Society, Kansai Branch–89th Lecture Course Teaching Material", 1980, with English translation.
D. Naessens, "Numerical Control and Programming of Press–Brakes", *Sheet Metal Industries*, vol. 55, No. 2, pp. 134–145 (Feb. 1978).
C. Jewell, "The Advantages of NC Press–Brake Operating", *Sheet Metal Industries*, vol. 52, No. 9, pp. 511–515 (Sep. 1975).
J. Jenkins, "Sequential Control of Back–Gauge and Depth–Stop Equipment for Press Brake", *Sheet Metal Industries*, vol. 52, No. 9, pp. 516–518 (Sep. 1975).

*Primary Examiner*—David Jones
*Attorney, Agent, or Firm*—Greenblum & Bernstein, P.L.C.

[57] ABSTRACT

A press brake for bending a sheet-shaped work between an upper tool and a lower die and a method of bending the work are provided. In the method, at first, bending angles at plural positions of the work are measured by a trial bending. Next, based on the bending angles obtained, an engagement positional relation between the upper tool and the lower die is corrected to achieve accurate bending of the work at a target bending angle in order to carry out the method, the press brake includes a control unit for calculating a D value of a distance from a bottom of the lower die to a tip of the upper tool.

13 Claims, 15 Drawing Sheets

U.S. PATENT DOCUMENTS

| | | |
|---|---|---|
| 4,282,738 | 8/1981 | Kojima et al. . |
| 4,366,699 | 1/1983 | Tsuchiyama . |
| 4,408,471 | 10/1983 | Gossard et al. . |
| 4,430,879 | 2/1984 | Rolland . |
| 4,486,841 | 12/1984 | Koyama et al. . |
| 4,511,976 | 4/1985 | Graf . |
| 4,550,586 | 11/1985 | Aubert et al. . |
| 4,564,765 | 1/1986 | Blaich . |
| 4,620,435 | 11/1986 | Gabella et al. . |
| 4,640,113 | 2/1987 | Dieperink et al. . |
| 4,797,831 | 1/1989 | Dressing et al. . |
| 4,802,357 | 2/1989 | Jones . |
| 4,819,467 | 4/1989 | Graf et al. . |
| 4,864,509 | 9/1989 | Somerville et al. . |
| 4,966,029 | 10/1990 | Zbornik . |
| 5,007,264 | 4/1991 | Haack ........ 72/702 |
| 5,062,283 | 11/1991 | Miyagawa et al. . |
| 5,099,666 | 3/1992 | Sartorio et al. . |
| 5,148,693 | 9/1992 | Sartorio et al. . |
| 5,272,643 | 12/1993 | Tokai . |
| 5,275,031 | 1/1994 | Whiteside et al. . |
| 5,285,668 | 2/1994 | Tokai . |
| 5,329,597 | 7/1994 | Kouno et al. . |
| 5,350,347 | 9/1994 | Fujiwara et al. . |
| 5,367,902 | 11/1994 | Kitabayashi et al. . |
| 5,483,750 | 1/1996 | Ooenoki et al. . |
| 5,497,647 | 3/1996 | Nagakura ........ 72/31.1 |

METHOD OF BENDING WORKPIECE TO TARGET BENDING ANGLE ACCURATELY AND PRESS BRAKE FOR USE IN THE SAME METHOD

TECHNICAL FIELD

This invention relates to a method of bending processing (i.e., bending) of works (i.e., workpieces) with a press brake and a press brake for use in the same method, and more particularly, to a method of bending processing in which, after bending angles at plural positions of a sheet-shaped work are measured by trial bending thereof, an engagement positional relation between the upper tool and lower die is corrected according to the measured actual bending angles to achieve accurate bending processing of the work at a target bending angle, and a press brake for use in the same method.

Further, the present invention relates to a bending processing apparatus, and more particularly, to a press brake comprising a control unit for calculating a D value of a distance from the bottom of a die to the tip of a punch so as to control the press brake.

BACKGROUND ART

As schematically shown in FIG. 6, a conventional press brake comprises a upper apron 7 (alternatively referred to as a upper table or a fixed table) fixed on a left and right side frame 5L, 5R respectively mounted on a base 3, and a lower apron 9 (or referred to as a lower table or a movable table) provided so as to oppose the upper apron 7, the lower apron being vertically movable.

Hydraulic cylinders 11L, 11R are provided on the left and right sides respectively to move the above lower apron 9 vertically. At appropriate positions of the lower apron 9, crowning cylinders 13 are provided to compensate for a downward curve in the lower apron 9 generated at the time of bending a sheet-shaped work W.

The same Figure shows a case in which two crowning cylinders 13 are provided, however crowning cylinders may be provided in the center of the lower apron 9 or the upper apron 7. That is, the crowning cylinders may be provided in an arbitrary number, and may be provided on either the upper apron 7 or the lower apron 9.

An upper tool 15 is installed on the bottom of the upper apron 7 and a lower die 17 is installed on the top of the lower apron 9.

According to the above-described construction, hydraulic oil is supplied to the left and right hydraulic cylinders 11L, 11R. As a result, the lower apron 9 is raised so as to engage the upper tool and lower die 15, 17 appropriately, such that the work W is bent and processed by the upper tool and lower die 15, 17.

When the work W is bent as described above, the upper apron 7 is inclined to curve so as to protrude upward and the lower apron 9 is inclined to curve so as to protrude downward. As a result, the bending shape of the work W becomes so-called "ship-shaped" so that the center portion thereof tends to be loose.

Thus, to correct the curve of the lower apron 9, a pressurized oil is supplied to the crowning cylinders 13 and the curve is corrected in a trial and error manner to make the upper and lower aprons parallel to each other, which consumes a significant amount of time.

Moreover, the bending angle of the work W can be arbitrarily set by controlling the engagement positional relation between the upper tool and lower die 15, 17. To control the engagement positional relation between the upper tool and lower die 15, 17, the ascent stop position of the lower apron 9 can be arbitrarily set.

That is, as schematically shown in FIG. 7, hydraulic pumps P are connected to the left and right hydraulic cylinders 11L, 11R. With respect to the connection of the hydraulic pump P to the left and right hydraulic cylinders 11L, 11R, separate hydraulic pumps may be connected thereto separately or a single hydraulic pump may be connected thereto through branching.

A connecting oil path 19, connecting to the hydraulic pump P and the left and right hydraulic cylinders 11L, 11R, is connected to a branch line 23, which is connected to an upper limit valve 21.

In the above upper limit valve 21, a valve 21V is pressed by a spool 21S against the pressure of a spring SP to control the degree of opening between the valve 21V and the seat SE, so that hydraulic oil flowing from the branch line 23 to a tank T is controlled.

The above upper limit valves 21 are provided on both sides of the lower apron 9 to control the ascent stop positions of both sides of the lower apron 9. To press the spool 21S of this upper limit valve 21, levers 25 are provided swingably in the vertical direction on both frames of the press brake 1 and one end of the lever 25 is in contact with the top end of the spool 21S.

Then, corresponding to the left and right levers 25, vertical guides 27 are provided on the frames of the press brake, and nut members 29 are provided so as to move vertically freely along the guides 27. A screw pestle 31, provided in parallel to the guide 27, is engaged with this nut member 29. On the top end of this screw pestle 31, a cap 33 which contacts the other end of the lever 25 is provided.

To rotate the screw pestle 31, the frame is equipped with a servo motor SM having a rotary encoder E as a position detector. The rotary shaft 35 of this servo motor SM and the bottom end of the screw pestle 31 are spline-engaged with each other for the screw pestle to be vertically movable.

Then, a contacting member 37 capable of contacting each of the left and right nut members 29 from below is provided on each of the left and right sides of the lower apron 9.

Thus, if the lower apron 9 is raised by supplying a hydraulic oil to the left and right hydraulic cylinders 11L, 11R, the contacting members 37 provided on the left and right sides of the lower apron 9 make a contact with each of the nut members 29 on both sides, so that the left and right screw pestles 31 are raised.

If the left and right screw pestles 31 are raised, the caps 33 swing each of the levers 25, so that the levers 25 press the spools 21S in the left and right upper limit valves 21. If the spools 21S are pressed, an opening is produced between the valve 21V and the seat 21SE in the upper limit valve 21, so that a pressurized oil is discharged from the branch line 23 into the tank T.

As the ascent of the lower apron 9 progresses, the opening between the valve 21V and the seat 21SE is increased gradually. Then, when the force of raising the lower apron 9 by pressures applied to the left and right hydraulic cylinders 11L, 11R is balanced with a sum of the weight of the lower apron 9 and a load used for the bending processing of the work W, the ascent of the lower apron 9 is stopped.

When the ascent of the lower apron 9 is stopped as described above, if the nut member 29 is moved upward by controlling the servo motor SM appropriately, the nut members 29 separate from the contacting member 37, so that the lever 25 is rotated counterclockwise by the action of the spring S. As a result, the opening between the valve 21V and the seat 21SE in the upper limit valve 21 is squeezed by the action of the spring SP. Consequently, pressures in the left and right hydraulic cylinders 11L, 11R rise so that the lower apron 9 is raised further.

Then, if as described above, the contacting member 37 makes a contact with the nut member 29 so as to enlarge the opening of the upper limit valve 21, the lower apron 9 stops ascending as described previously.

Conversely, when the contacting member 37 is in contact with the nut member 29 such that the lower apron 9 stops ascending, if the servo motor SM is rotated inversely to the direction mentioned above to intend to bring down the nut member 29, the screw pestle 31 relatively rises because the nut member 29 is in a contact with the contacting member 37 such that it does not go down. Consequently, with respect to FIG. 7, the lever 25 is rotated clockwise.

If the lever 25 is rotated clockwise, the opening of the upper limit valve 21 is enlarged further and the pressures in the hydraulic cylinders 11L, 11R drop so that the lower apron 9 descends. If the lower apron 9 descends so that the lever 25 returns to its original position, the lower apron 9 stops descending.

That is, by adjusting the vertical position of the nut member 29, it is possible to stop the lower apron 9 at a desired ascent position. By controlling the engagement positional relation between the upper tool and lower die 15, 17, it is possible to bend the work W at a desired angle.

Meanwhile, the left and right hydraulic cylinders 11L, 11R can be controlled separately and the transverse inclination of the lower apron 9 can be controlled.

When the bending processing of the work W is conducted with the engagement positional relation between the upper tool and lower die 15, 17 controlled as described above, the engagement positional relation between the upper tool and lower die 15, 17 can be calculated theoretically according to the bending angle of the work W.

However, when the bending processing of the work W is conducted, a deformation (deflection) may occur in the left and right side frames 5L, 5R of the press brake, the upper and lower aprons 7, 9, the upper tool and lower die 15, 17 and the like. It is therefore necessary to correct for the deflection.

Preceding examples regarding correction of the deflection are found in, for example, Japanese Patent Application Laid-Open No. 57-100820 (hereinafter referred to as preceding example 1), Japanese Patent Publication Laid-Open No. 3-54013 (preceding example 2), and Japanese Patent Application Laid-Open No. 6-26226 (preceding example 3).

The above preceding example 1 has disclosed an apparatus in which the amount of deflections of the side frames at the time of actual bending processing is detected to calculate an applied pressure and an appropriate amount of correction is calculated to control the engagement positional relation between the upper tool and lower die.

Further, the preceding example 2 has disclosed an apparatus for setting a deformation correction coefficient, based on an assumption that the amount of deformation of the side frame or the upper tool and lower die is parallel to the magnitude of pressure applied to the work, and controlling the engagement positional relation between the upper tool and lower die by using the deformation correction coefficient.

As in the preceding example 2, assuming that the amount of deformation is simply in a parallel relation to an applied pressure, a deformation correction coefficient must be obtained corresponding to the type of the upper tool and lower die or a combination thereof each time, so that there is a problem in improvement of the operation efficiency. Further, if the bottom end of the upper tool bites into a work (see lines 4–5 of the left column on page 6 of the preceding example 1), even if the deflection is corrected with an assumption that the amount of deformation is simply in a parallel relation to an applied pressure, there is a problem in improvement of bending accuracy.

According to the preceding example 3, by following a correction pattern based on a reference curve indicating a relation between the bending angle of the work and a D value for controlling the engagement positional relation between the upper tool and lower die, the engagement positional relation between the upper tool and lower die is controlled when the bending processing of the work is conducted. After the bending processing, an actual bending angle is measured, and based on this measurement result, the correction pattern is shifted to a new correction pattern following the reference curve.

As regards the above correction pattern, biting of the tip of the upper tool into the work is considered. Further, by measuring actual bending angles of the work, a new correction pattern is produced and then, the engagement positional relation between the upper tool and lower die is corrected based on this new correction pattern. As a result, the accuracy in bending is improved, thus this technique is preferable.

However, the correction pattern based on the above reference curve is a fixed pattern, and if any error is contained in this correction pattern, a new correction pattern obtained by the above shift also contains an error, which is not preferable in term of improvement of the accuracy in bending.

Further, a conventional bending processing apparatus equipped with a control unit for calculating and controlling the D value of a distance from the bottom of the die to the tip of the punch is well known as disclosed in Japanese Patent Application No. 1-20927. This invention is constructed according to the following experimental formula based on a limited database to obtain a final D value.

$$D(A)=D_1+(\delta_1+\delta_2+\delta_3+\delta_4+\delta_5)$$

In the above formula, $D_1$ is a geometrical D value. For general purpose, various factors are included, for example, $\delta_1$, $\delta_3$ are mechanical system deflection, $\delta_2$, $\delta_4$ are material property and $\delta_5$ are other factor.

By the way, the aforementioned conventional control system lacks general purpose functionally because it depends on a limited database and sometimes does not correspond to diversified conditions. For example, if an experimental formula derived from this database is utilized for work thickness and materials other than those obtained from actual experiment, no satisfactory precision can be obtained.

Particularly, this database is incomplete because it contains only the tensile strength parameter as a means for expressing material property. Further, to secure a desired bending accuracy, at each time of correction, the parameter is modified. Thus, the frequency of trial bending increases so that necessary tact time is prolonged.

SUMMARY OF THE INVENTION

Accordingly, to solve the above-described problems, an object of the present invention is to provide a method of bending processing of a work with a press brake and a press brake for use in the same method. According to one aspect of the present invention, there is provided a method of bending a sheet-shaped workpiece with a press brake in which the workpiece is pinched between an upper tool and lower die while an engagement positional relationship between said upper tool and lower die is controlled, said press brake further including an upper apron having the upper tool installed thereon, a lower apron having said lower die installed thereon and drive means for driving either one of the upper and lower aprons close to or apart from the other of the upper and lower aprons, comprising the steps of: (a) calculating a theoretical D value indicating a theoretical engagement positional relation between the upper tool and lower die that corresponds to a target bending angle, according to work information, die information and bending information; (b) bending the workpiece while controlling the engagement positional relationship between the upper tool and lower die, according to the theoretical D value; (c) measuring bending angles of the workpiece at a plurality of positions after the bending and calculating a mean value of the bending angles; (d) calculating a theoretical load for bending the work according to the mean value of the bending angles and then calculating theoretical mechanical deflection based on this theoretical load; (e) detecting actual pressure applied on the drive means during the bending of the workpiece; (f) calculating actual mechanical deflection based on the actual pressure; (g) calculating a correction value of the D value according to a different between the theoretical mechanical deflection and actual mechanical deflection; (h) correcting the engagement positional relationship between the upper tool and lower die by adding the correction value to the D value and performing the bending of the workpiece; (i) repeating the steps (c)–(h) until the mean bending angle of the workpiece reaches within a predetermined tolerance of the target bending angle; and (j) controlling the engagement positional relationship between the upper tool and lower die such that said engagement positional relationship remains constant after the bending angle of the workpiece reaches the value and repeating the bending a predetermined number of times in accordance with a quantity of workpieces.

According to another aspect of the present invention, there is provided a method of bending a workpiece with a press brake while an engagement positional relationship between the upper tool and lower die equipped on the press brake is controlled, said press brake further including an upper apron having the upper tool installed thereon, a lower apron having the lower die installed thereon, drive means for driving either one of the upper and lower aprons close to or apart from the other of the upper and lower aprons and crowning cylinders arranged under the lower apron to compensate for a downward drive during the bending, the method comprising: calculating a theoretical D value indicating a theoretical engagement positional relationship between the upper tool and lower die that corresponds to a target bending angle, according to work information, die information and bending information; piece bending the workpiece while controlling the engagement positional relationship between the upper tool and lower die according to the theoretical D value; measuring bending angles of the workpiece at a plurality of positions after the bending and calculating a theoretical load for bending the workpiece according to the mean value of the bending angles and calculating a theoretical mechanical deflection based on the theoretical load value; detecting actual pressure applied on the drive means during the bending of the workpiece; calculating an actual mechanical deflection based on the actual pressure; calculating a difference between the theoretical mechanical deflection and actual mechanical deflection; calculating the amount of deflection at a plurality of positions in a longitudinal direction of the lower apron of the press brake according to the difference between the theoretical deflection valve and the actual mechanical deflection valve and the bending angles of the workpiece at plural positions of the work and converting the amount of deflection at the plural positions in the longitudinal direction to calculate bending angles at plural corresponding positions of the workpiece; calculating pressure to be applied on the crowning cylinders in the lower apron according to the calculated bending angles at the plurality of corresponding positions; and curving the lower apron upward by applying the calculated pressure on the crowning cylinders to perform the bending of the workpiece with the upper tool and lower die.

According to still another aspect of the present invention, there is provided a method of bending a workpiece with a press brake while an engagement positional relationship between the upper tool and lower die is controlled, said press brake further including an upper apron having the upper tool installed thereon, a lower apron having the lower die installed thereon, drive means for driving either one of the upper and lower aprons close to or apart from the other of the upper and lower aprons and crowning cylinders arranged under the lower apron to compensate for a downward drive during the bending, said method comprising: calculating a theoretical D value indicating a theoretical engagement positional relationship between the upper tool and lower die that corresponds to a target bending angle according to work information, die information and bending information; piece bending the workpiece while controlling the engagement positional relationship between the upper tool and lower die, according to the theoretical D value; measuring bending angles of the workpiece at a plurality of positions after the bending and calculating a mean value of the bending angles; calculating a mean value of the bending angles by calculating a theoretical load value for bending the workpiece according to the mean value of the bending angles and calculating a theoretical mechanical deflection value based on the theoretical load value; detecting actual pressure applied on the drive means during the bending of the workpiece; calculating an actual mechanical deflection value based on the actual pressure; calculating a difference between the theoretical mechanical deflection value and the actual mechanical deflection value; calculating an amount of deflection at plural positions in a longitudinal direction of the lower apron of the press brake according to the difference between the theoretical deflection value and the actual mechanical deflection value and bending angles of the workpiece at the plural positions, and converting the amount of deflection at the plural positions in the longitudinal direction to bending angles at plural corresponding positions of the workpiece; calculating pressure to be applied on the crowning cylinders in the lower apron according to the calculated bending angles at the plural corresponding positions; calculating bending angles of both sides of the workpiece which are bent by applying the calculated pressures on the crowning cylinders and calculating an amount of correction for the D value according to the calculated bending angles; and calculating an instructive value according to a correction amount for the D value and the theoretical D value and controlling the upper tool and lower die according to the instructive value to perform the bending of the workpiece.

According to a further aspect of the present invention, there is provided a method of bending a sheet-shaped workpiece with a press brake in which the workpiece is pinched between upper tool and lower die while an engagement positional relationship between the upper tool and lower die is controlled, said press brake further including an upper apron having the upper tool installed thereon, a lower apron having said lower die installed thereon and drive means for driving either one of the upper and lower aprons close to or apart from the other of the upper and lower aprons, the method comprising: (a) calculating a theoretical D value indicating a theoretical engagement positional relationship between the upper tool and lower die that corresponds to a target bending angle according to workpiece information, die information and bending information; (b) calculating a theoretical load value according to the workpiece information, the die information and the bending information and calculating a theoretical mechanical deflection value according to the theoretical load value; (c) calculating an instructive D value indicating the engagement positional relationship between the upper tool and lower die according to the theoretical D value and a theoretical mechanical deflection value and performing bending of the workpiece according to the instructive D value; (d) measuring bending angles of the workpiece at a plurality of positions after the bending and calculating a mean value of the bending angles; (e) calculating a theoretical load value for bending the workpiece according to the mean value of the bending angles and calculating a theoretical mechanical deflection value based on the theoretical load value; (f) detecting actual pressure applied on the drive means during the bending of the workpiece; (g) calculating an actual mechanical deflection based on the actual pressure; (h) calculating a correction for the value instructive D value according to a difference between the theoretical mechanical deflection value and the actual mechanical deflection value; (i) correcting the engagement positional relationship between the upper tool and lower die by adding the correction value to the D value and performing the bending of the workpiece again; (j) repeating the steps (d)–(i) until the mean bending angle of the workpiece reaches an acceptable value within a predetermined tolerance of the target bending angle; and (k) controlling the engagement positional relationship between the upper tool and lower die such that the engagement positional relationship remains constant after the bending angle of the work reaches the acceptable target value and repeating the bending in accordance with a predetermined quantity of workpieces.

According to a still further aspect of the present invention, there is provided a press brake in which a sheet-shaped workpiece is pinched between an upper tool and a lower die while an engagement positional relationship between the upper and lower dies is controlled to perform bending of the workpiece, the press brake comprising: means for calculating a theoretical D value indicating a theoretical engagement positional relationship between the upper tool and lower die that corresponds to a target bending angle, according to workpiece information, die information and bending information; means for bending the workpiece while controlling the engagement positional relationship between the upper tool and the lower die according to the theoretical D value; means for measuring bending angles of the workpiece at a plurality of positions after the bending and calculating a mean value of the bending angles; means for calculating a theoretical load value for bending the workpiece at the mean value of the bending angles and calculating a theoretical mechanical deflection value based on the theoretical load value; means for detecting actual pressures applied on the drive means during the bending of the workpiece; means for calculating an actual mechanical deflection value based on the actual pressure; and means for calculating a correction value for the theoretical D value according to a difference between the theoretical mechanical deflection value and the actual mechanical deflection value.

According to a yet still further aspect of the present invention, there is provided a press brake for performing bending of a workpiece by controlling an engagement positional relationship between an upper tool and a lower die, the press brake comprising: an upper apron having the upper tool installed thereon; a lower apron having the lower die installed thereon; drive means for driving either one of the upper and lower aprons close to or apart from the other of the upper and lower aprons; crowning cylinders arranged under the lower apron to compensate for a downward curve during the bending; means for calculating a theoretical D value indicating a theoretical engagement positional relationship between the upper tool and the lower die that corresponds to a target bending angle, according to workpiece information, die information and bending information; means for bending the workpiece while controlling the engagement positional relationship between the upper tool and lower die, according to the theoretical D value; means for measuring bending angles of the workpiece at a plurality of positions after the bending and calculating a means value of bending angles; means for calculating a theoretical load value for bending the work at the mean value of the bending angles and calculating a theoretical mechanical deflection value based on the theoretical load value; means for detecting actual pressure applied on the drive means during the bending of the workpiece; means for calculating an actual mechanical deflection value based on the actual pressure; means for calculating a different between the theoretical mechanical deflection value and actual mechanical deflection value; means for calculating an amount of deflection at plural positions in a longitudinal direction at the lower apron in the press brake and converting the amount of deflection at the plural positions to bending angles at plural corresponding positions of the workpiece; means for calculating pressures to be applied on the crowning cylinders in the lower apron according to the calculated bending angles at the plural corresponding positions; means for calculating bending angles of both sides of the workpiece which are bent by applying the calculated pressure to the crowning cylinders and calculating a correction value for the D value according to the calculated bending angles; and means for calculating an instructive value according to the correction value for the theoretical D value and the theoretical D value and controlling the engagement positional relationship between the upper tool and lower die according to the instructive value to perform the bending of the workpiece.

According to a yet still further aspect of the present invention, there is provided a press brake in which a sheet-shaped work is pinched between an upper tool and a lower die while on engagement positional relationship between the upper tool and lower die is controlled to perform bending of the workpiece, said press brake comprising: having the lower die installed thereon; drive means for driving either one of the upper and lower aprons close to or apart from the other of the upper and lower aprons; crowning cylinders arranged under the lower apron to compensate for a downward curve during the bending; means for calculating a theoretical D value indicating a theoretical engagement positional relationship between the upper tool and the lower die that corresponds to a target bending angle, according to work information, die information and bending information; means for calculating a theoretical load value according to the workpiece information, the die information and the bending information and calculating a theoretical mechanical deflection value according to the theoretical load value; means for calculating an instructive D value indicating the engagement positional relationship between the upper tool and lower die according to the theoretical D value and a theoretical mechanical deflection value and then performing bending of the workpiece according to the instructive D value; means for measuring bending angles of the workpiece at a plurality of positions after the bending and calculating a mean value of the bending angles; means for calculating a theoretical load value for bending the workpiece according to the mean value of the bending angles and calculating a theoretical mechanical deflection value based on the theoretical load value; means for detecting actual pressure applied on the drive means during the bending of the workpiece; means for calculating actual mechanical deflection value based on the actual pressure; means for calculating a correction value for the theoretical D value according to a difference between the theoretical mechanical deflection value and the actual mechanical deflection value; and means for correcting the engagement positional relationship between the upper tool and lower die by adding the correction value to the instructive D value and performing the bending of the work again.

According to the above-described construction of the present invention, the D value indicating the engagement positional relationship between the upper tool and lower die is calculated according to the workpiece information, the die information and the bending information, and the engagement positional relationship is controlled according to this calculated D value to perform the bending of the workpiece.

After that, the bending angles at plural positions of the workpiece are measured to calculate a mean value, a theoretical load value is calculated to bend the workpiece at this mean value of the bending angles and then a theoretical mechanical deflection value is calculated according to this theoretical load value.

Further, pressures applied to the left and right hydraulic cylinders at the time of actual bending of the workpiece is detected and an actual mechanical deflection is calculated according to this actually applied pressures.

Further, according to a difference between the theoretical mechanical deflection value and the actual mechanical deflection value, the amount of correction for the D value is calculated and the engagement positional relationship between the upper tool and lower die is corrected by adding this amount of correction to the D value to perform the bending of the workpiece.

Further to attain the above-described objects, the present invention provides a press brake for performing bending of a workpiece between a punch and a die by reciprocating at least one of an upper table and a lower table, the punch being provided on the bottom of the upper table and the die being provided on the top of the lower table and having a V-shaped groove, the press brake including a control unit for calculating and controlling a distance D from a bottom of the die to a tip of the punch, the control unit comprising: means for inputting bending information relating to the punch, the die, and the workpiece; means for determining whether the workpieces winding around the tip of the punch in accordance with the bending information inputted into the input means; means for calculating an amount of spring-back of the workpiece in accordance with a result of the workpiece winding determination means; air bend/bottoming determination means for determining whether the workpiece is bent under air bend or bottoming conditioned by the amount of spring-back and a target angle; means for calculating a workpiece pinching angle when the air bend/bottoming determination means determines bending under the air-bend condition; means for calculating pressure to be applied at the workpiece pinching angle calculated by the workpiece pinching angle calculating means; and means for calculating a position of one of the upper table and the lower table to be moved when the workpiece is pinched at the workpiece pinching angle.

The above mentioned press brake preferably comprises a means for calculating a mechanical deflection of the press brake according to the pressure applied at the angle in which the work is pinched, and means for calculating a final table position according to the position of one of the upper and lower tables to be moved and the mechanical deflection.

According to a yet still further aspect of the present invention, there is provided a press brake for performing bending of a workpiece between a punch and a die by reciprocating at least one of an upper table and a lower table, the punch being provided on the bottom of the upper table and the die being provided on the top of the lower table and having a V-shaped groove, said press brake including a control unit for calculating and controlling a distance D from a bottom of the die to a tip of the punch, the control unit of the press brake comprising means for inputting bending information relating to the punch, the die, and the workpiece and means for determining whether the workpiece is winding around the tip of the punch in accordance with the bending information inputted into the input means; means for calculating an amount of spring-back of the workpiece in accordance with a result by the workpiece winding determination means; air bend/bottoming determination means for determining whether the workpiece is bent under air bend or bottoming condition by the amount of spring-back and a target angle; means for calculating a workpiece pinching angle when the air bend/bottoming determination means determines bending under the bottoming condition; means for calculating pressure to be applied at the workpiece pinching angle calculated by the workpiece pinching angle calculation means; means for calculating a first boundary load value between a bottoming area where said workpiece is bent under the bottoming condition and an air bend area where said workpiece is bent under the air bend condition, the first boundary load value existing on the side of the bottoming area; means for obtaining a second boundary load in the air bend area valve between the bottoming area and to the air bend area, the second boundary load value existing on the side of the air bend area; means for calculating a load value required for the bottoming by shifting the first boundary load value to the second boundary load value; means for calculating a position of one of the upper table and lower table to be moved when the workpiece is pinched at the workpiece pinching angle.

The above-described bending processing apparatus preferably comprises means for calculating a mechanical deflection of the press brake according to the required load calculated by the load operation means; and means for calculating a final table position according to the table moving position at the time of bottoming, calculated by the means for calculating a position of one of the upper and lower tables to be moved upon bottoming and the mechanical deflection calculating means.

In the press brakes explained above, before the bending processing of a workpiece is conducted by a cooperation between the punch and the die, the material of the work, tensile strength, workpiece thickness and other data are input through the input means and memorized. Then, the workpiece winding determination means determines whether or not the workpiece winds around the tip of the punch.

If it is determined that the work winds therearound, the spring-back amount operation means obtains the amount of spring-back. Next, the air bend/bottoming determination means determines whether the air bend or bottoming occurs.

If it is determined that the air bend occurs, the workpiece pinching angle calculating means obtains a workpiece pinching angle and then the means for pressure applied at angle in which the workpiece is pinched obtains a pressure applied at the angle in which the workpiece is pinched. Further, a table moving position at angle in which the workpiece is pinched is obtained by the means for table moving position at angle in which the work is pinched. Then, with this table moving value as the D value, the bending processing of the workpiece is achieved.

If it is determined that bottoming occurs, the spring-back amount means obtains the amount of spring-back and the workpiece pinching angle calculating means obtains a work pinching angle. Then, a pressure applied at this angle which the workpiece is pinched is obtained by the means for calculating a pressure applied at angle in which the workpiece is pinched.

Next, the first boundary load calculating means obtains a boundary load in the bottoming area relative to the air bend area, and the second boundary load calculating means obtains a boundary load in the air bend area. Then, by shifting the boundary load calculated by the first boundary load calculating means to the boundary load calculated by the second boundary load calculating means, a required load is obtained by the required load calculating means.

The means for calculating a table moving position at the angle in which the work is pinched obtains a table moving position at the angle in which the work is pinched according to a work pinching angle. The first boundary value calculating means calculates a boundary value in the bottoming area relative to the air bend area and then the second boundary value calculating means obtains a boundary value in the air bend area. Then, the means for calculating a table moving position upon bottoming shifts the boundary value calculated by the first boundary value calculating means to the boundary value calculated by the second boundary value calculating means to obtain a table moving position upon bottoming. With this table moving position upon bottoming as the D value, the bending of the workpiece is controlled and performed.

DETAILED DESCRIPTION OF THE PREFERRED EMBODIMENTS

Figure 1:
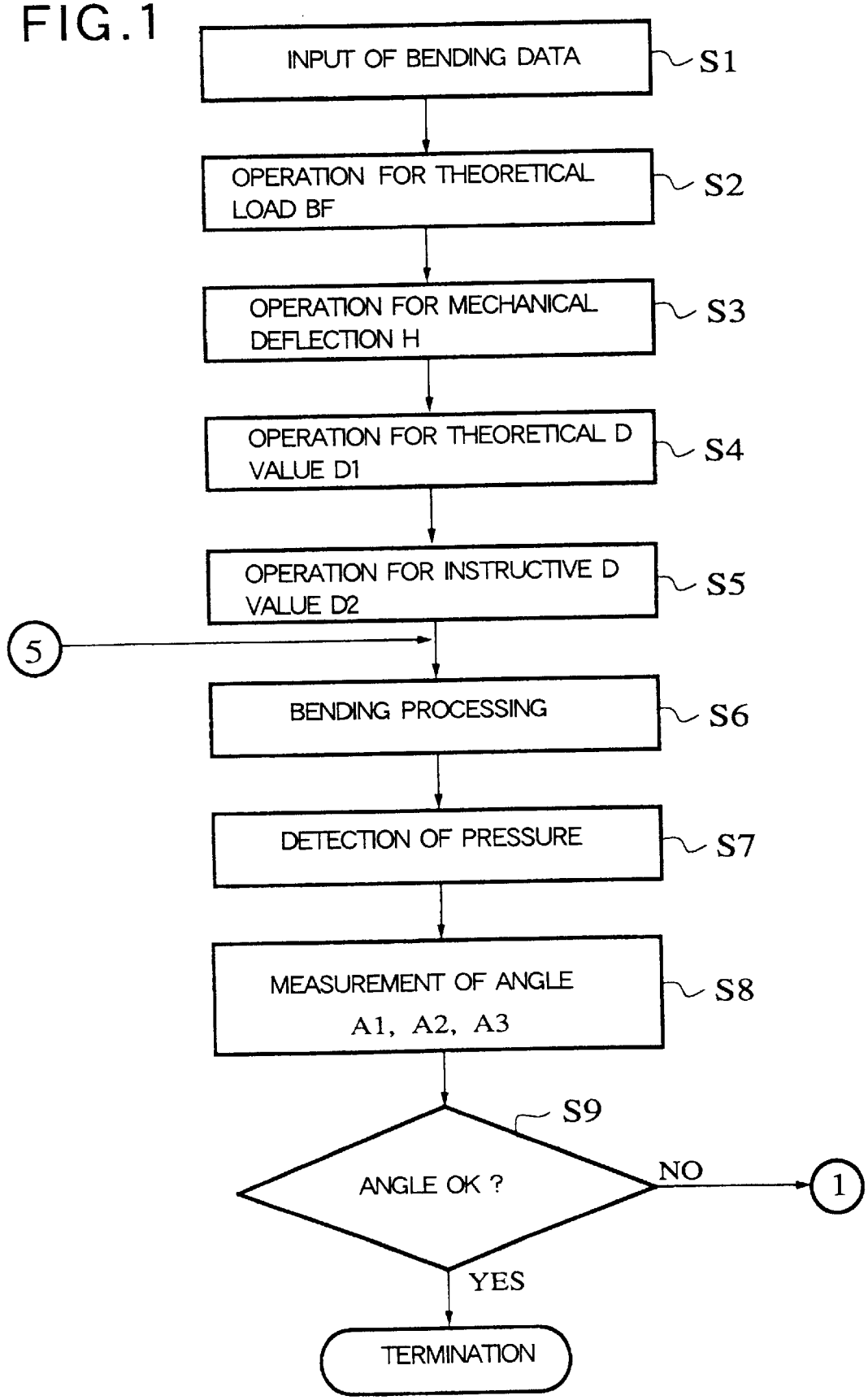
FIG. 1 is a flow chart of the method according to the present invention.
Figure 2:
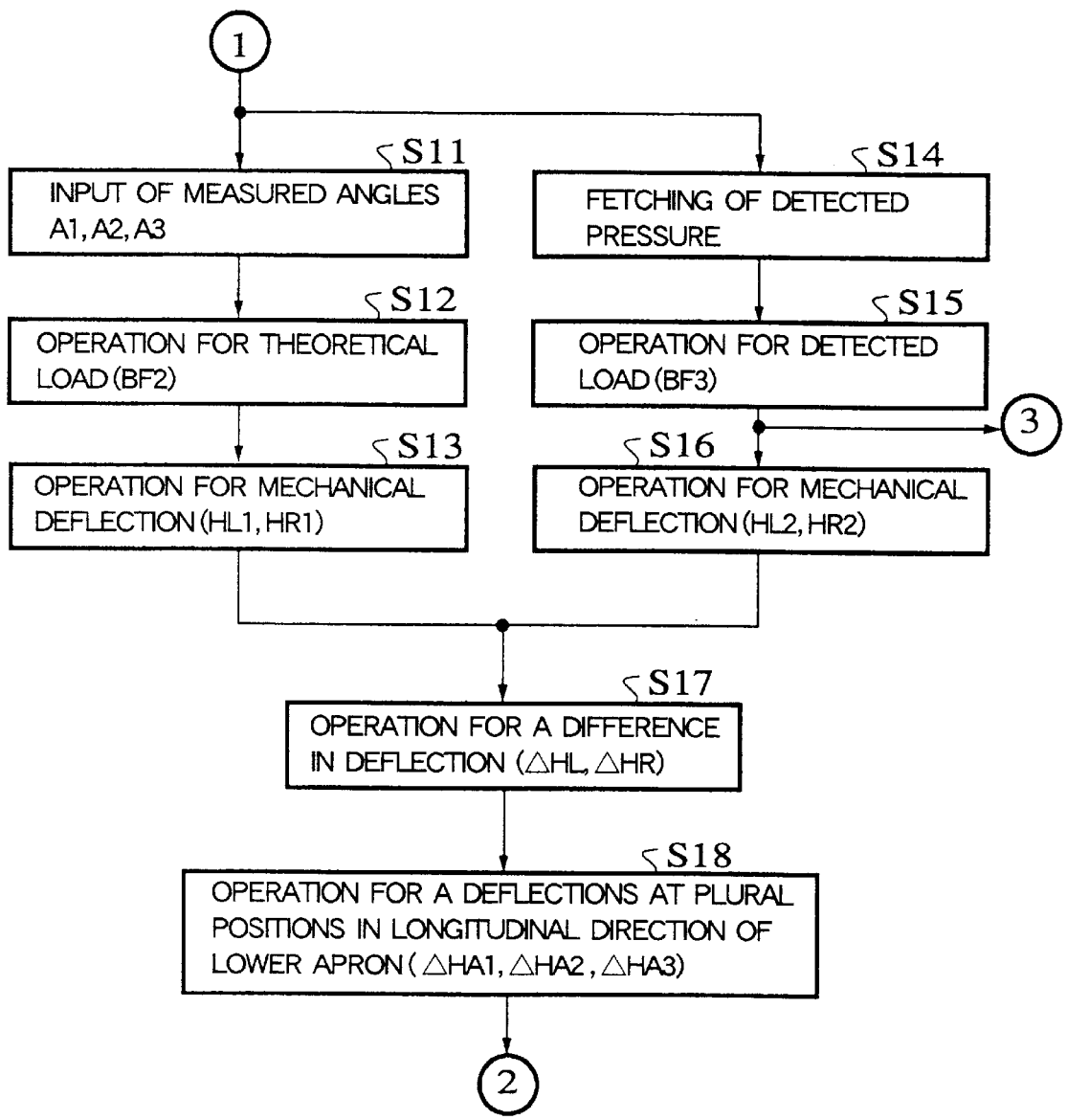
FIG. 2 is a flow chart of the method according to the present invention.
Figure 3:
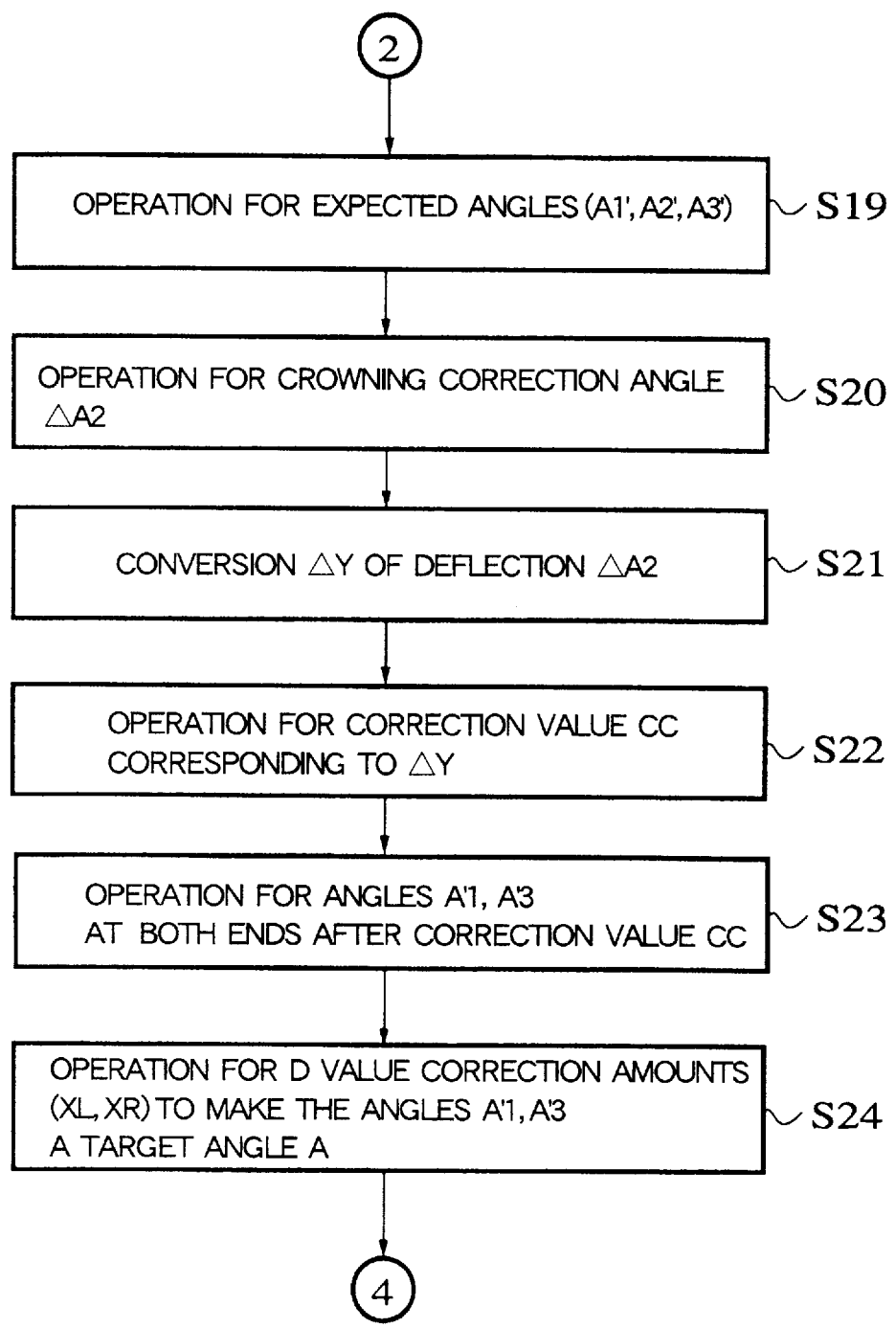
FIG. 3 is a flow chart of the method according to the present invention.
Figure 4:
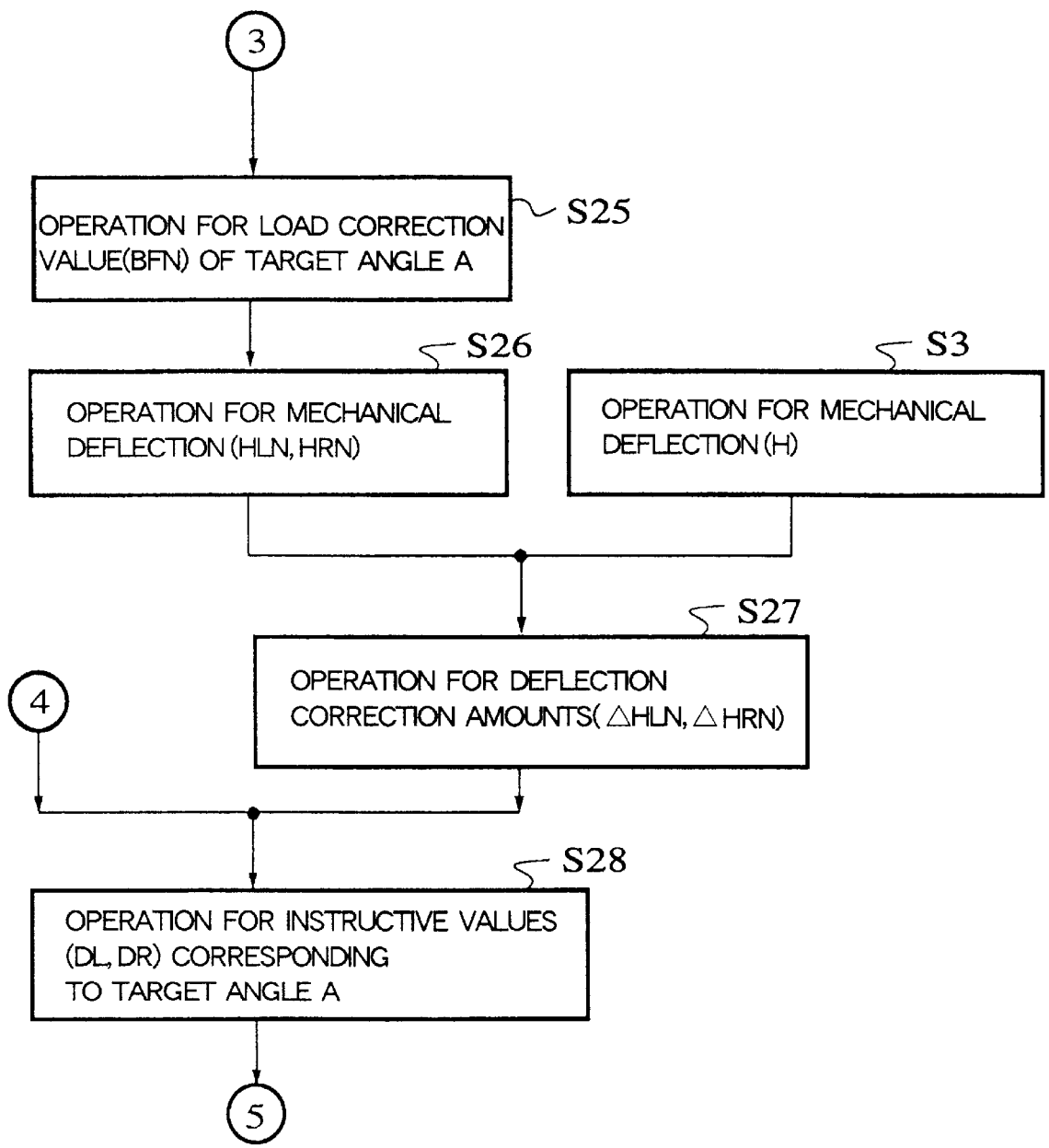
FIG. 4 is a flow chart of the method according to the present invention.
Figure 5:
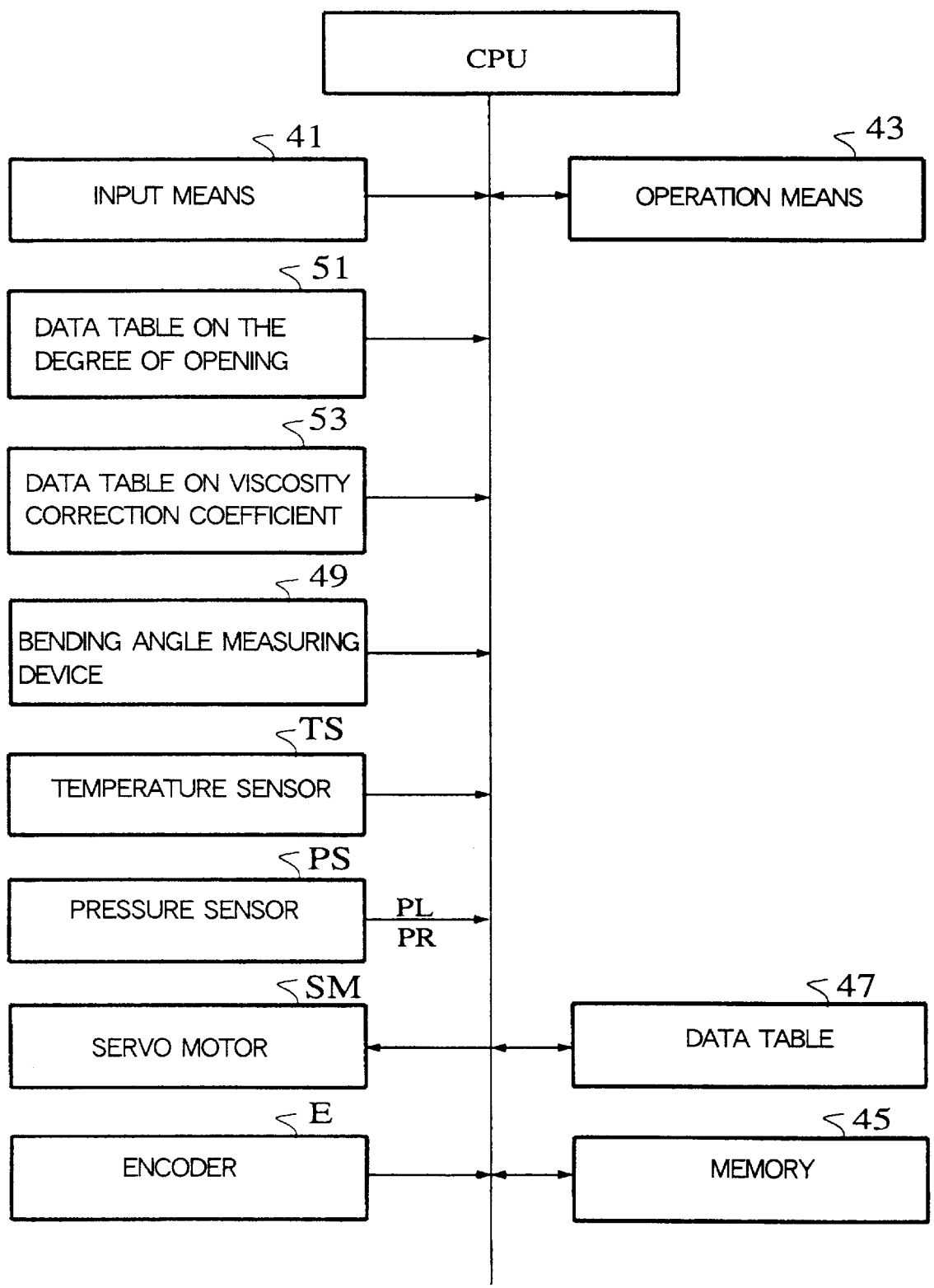
FIG. 5 is an explanatory diagram showing the construction of a control unit in the form of functional blocks.
Figure 6:
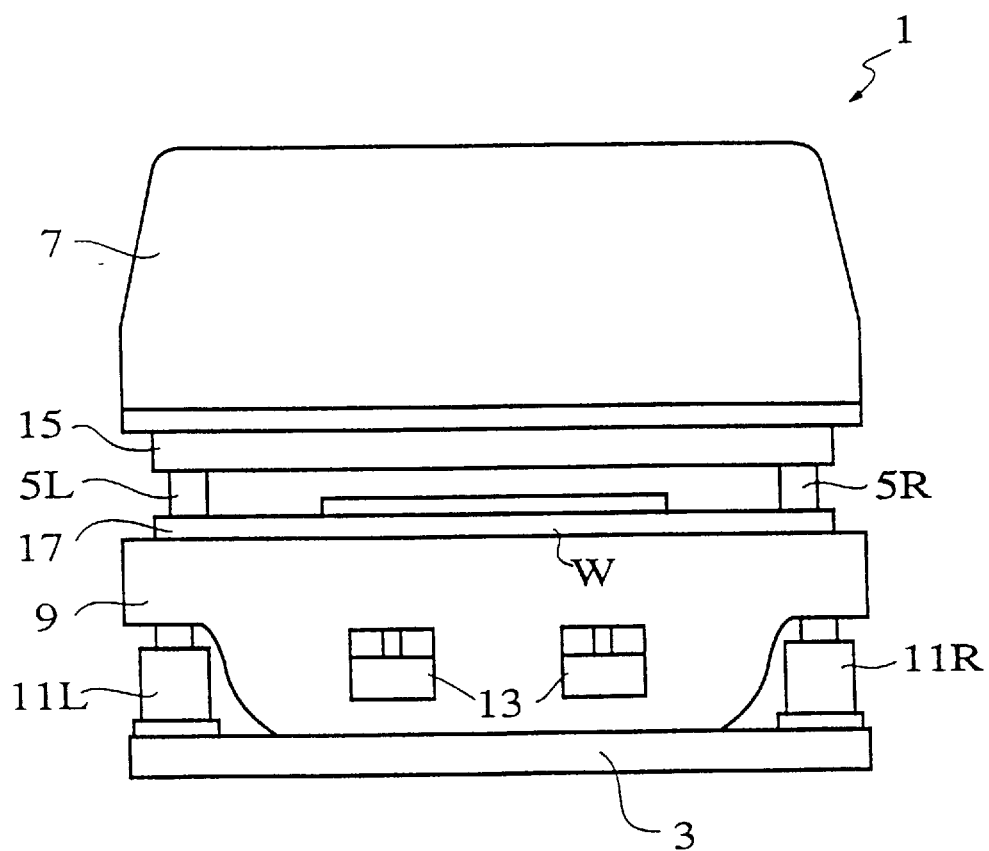
FIG. 6 is a schematic front view of a press brake.

Hereinafter, embodiments of the present invention will be described with reference to the accompanying drawings. The mechanical construction of the press brake is the same as that of the prior art shown in FIGS. 6 and 7. Thus, a detailed description of the mechanical construction of the press brake is omitted.

Referring to FIGS. 1–5, bending data such as work (i.e., workpiece) information, die information, bending information and the like is input from an input means 41 and the absolute value BP of the offset amount of the work W is input from the center portion (step S1). Then, a theoretical load BF is calculated by a calculating means under a control of CPU (step S2) and a mechanical deflection H is calculated (step S3).

The above work information includes the thickness t, the tensile strength S and the bending length B of the work W. The die information includes the minute radius Rp of the tip of the upper tool, the width V of the V-shaped groove in the lower die, the angle θ of the V-shaped groove and the radius R of the corner of the V-shaped groove. Further, the bending information is the bending angle A.

Based on the above bending data, the theoretical load BF is expressed as follows:

$$BF = f(n, s, u, V, t, A)$$

Here, "n" is a work hardening index indicating the degree in ease/difficulty of work hardening. "u" is a frictional coefficient between the work W and the die. Then, the theoretical load BF which is a result of the operation is stored in a memory 45.

The above mechanical deflection H can be expressed in the following formula.

$$H = G + J + T + \delta$$

Where G is the amount of opening of a jaw due to the deformation of frame, J is the degree of opening of upper limit valve, T is the deflection of die and δ is the deflection of table. The degree of opening J can be expressed as follows:

$$J = K_2 \times (BF)^2 + K_3 \times (BF) + K_4$$

$$T = K_5 \times BF$$

Where $K_2$, $K_3$, $K_4$, $K_5$ are coefficients.

Meanwhile, the amount of opening of jaw G due to the deformation of frame and the deflection δ of the table represent, respectively, a distortion which occurs in the left and right side frames, and a deflection which occurs in the tables when a pressurized hydraulic oil is supplied to the left and right hydraulic cylinders to apply a pressure. A relation between applied load and individually measured amount of opening of jaw G and deflection δ of table is compiled in a data table 47. These values can be read arbitrarily from this data table 47.

When the work W is located in the center of the table, the theoretical load BF may be equally divided to the left and right hydraulic cylinders 11L, 11R. However, if the work W is deviated to either the left or the right, it must be divided to the left and right hydraulic cylinders 11L, 11R corresponding to the amount of offset of the work W.

That is, without using the above amount of offset BP, if distances from the left and right hydraulic cylinders 11L, 11R to the center of the work W are assumed to be LL and LR respectively and loads applied to the left and right hydraulic cylinders 11L, 11R are assumed to be BFL and BFR respectively, the respective loads BFL, BFR can be expressed as follows:

$$BFL = [LL/(LL+LR)] \times BF$$

$$BFR = [LL/(LR+L4)] \times BF$$

Thus, by substituting the left and right loads BFL, BFR respectively for the degree of opening J of the upper limit valve and the deflection of die T, it is possible to calculate the degree of opening J of the left and right upper limit valves and the deflection in dies on the left and right sides individually. Then, by retrieving the amounts of opening of jaw GL, GR on the left and right side frames 5L, 5R and the deflections of the table on the left and right sides from the data table 47 storing those values, it is possible to obtain the deflections of this machine on the left and right sides HL, HR.

If the bending data is input as described above (step S1), a theoretical D value D1 is calculated to control the engagement positional relation (i.e., relationship) between the upper tool and lower die according to the work information, the die information and the bending information (step S4). This theoretical D value D1 is calculated separately for the left and right sides. If the work W is located in the center of the table, these values are equal. The above theoretical D value D1 is for arithmetic operation in terms of geometry to see how much the work W located horizontally on the top of the lower die should be pressed into the V-shaped groove in the lower die by the bottom of the upper tool in order to obtain a desired bending angle A in the work W.

Meanwhile, a position which serves as a reference point for the engagement positional relation between the upper tool and lower die or the top face of the lower die when the upper tool and lower die are engaged with each other and a predetermined pressure is applied thereto.

Next, an instructive D value D2 corrected by adding the above mechanical deflection H to the theoretical D value D1 is calculated separately for the left and right sides (step S5).

Figure 7:
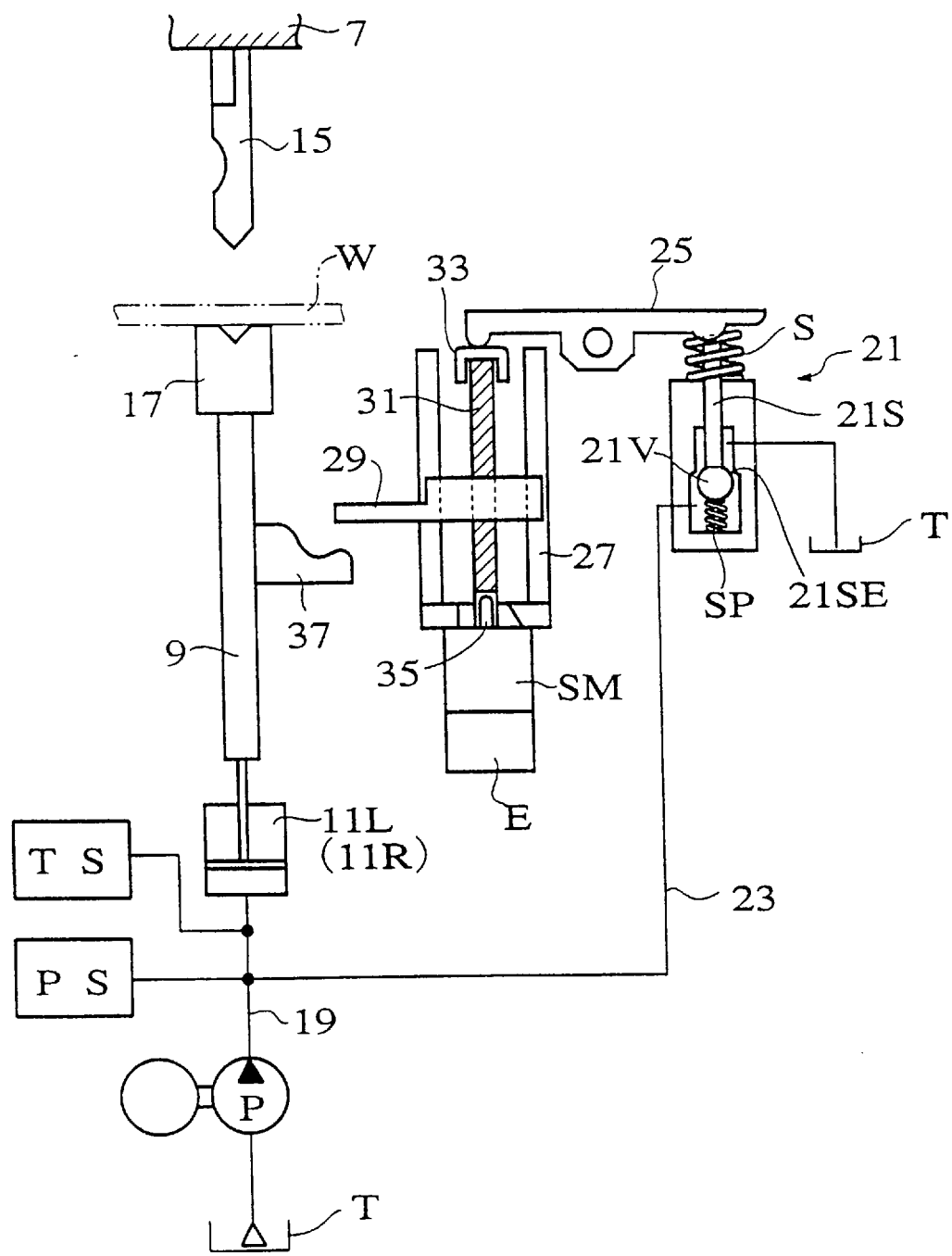
FIG. 7 is a diagram showing schematically the construction of the control unit for controlling the vertical movement of the lower apron.

If the instructive D value is calculated as described above, servo motors SM on the left and right sides shown in FIG. 7 are controllably driven according to this D value D2, thereby adjusting the vertical position of the left and right nut member 29. After that, a pressurized oil is supplied to the left and right hydraulic cylinders 11L, 11R so that the lower apron 9 is raised to bend the work W by means of the left and right dies 15, 17 (step S6).

When the work W is subjected to bending processing (i.e., bending) by the upper tool and lower die 15, 17 as described above, the hydraulic pressures PL, PR in the left and right hydraulic cylinders 11L, 11R are detected by respective pressure sensors PS connected to the left and right hydraulic cylinders 11L, 11R (step S7). Then, the detected pressures PL, PR are stored in the memory 45.

After the bending processing of the work W is achieved as described above, a plurality of positions in the work W, for example, the bending angles (A1, A2, A3) on the left side, the center portion and the right side, are measured (step S8). Then whether the above bending angles (A1, A2, A3) or a mean thereof is within a tolerance in the initial bending angle is determined (step S9). If it is within the tolerance, the bending processing is terminated (step S10).

That is, if actually measured angles A1, A2, A3 of the bending angles are within their tolerances, it means that the aforementioned instructive D value D2 has been set accurately. Upon bending processing of the same work with the same angle, the nut member 29 is held at a position determined based on the instructive D value D2 and the bending processing of the works W is conducted repeatedly.

Meanwhile, the bending angles A1, A2, A3 of the work W may be measured with the work W removed from the upper tool and lower die. Alternatively, those angles must be measured with a bending angle measuring devices 49 disposed at plural positions on the upper apron 7 or the lower apron 9 of the press brake.

If the measured values A1, A2, A3 of the bending angles are out of the tolerances, based on the inputs of the measured angles A1, A2, A3 (step S11), a theoretical load BF2 necessary for bending at an angle averaged of the above measured angles is calculated (step S12). Then, based on the theoretical load BF in the parentheses, the mechanical deflections H1, H2 of the left and right side frames are calculated (step S13).

Then, the detected pressures PL, PR in the left and right hydraulic cylinders 11, 11R detected by the respective pressure sensors PS are read or retrieved (step S14) and the detected loads BF3 which apply to the left and right hydraulic cylinders 11L, 11R are calculated (step S15). Based on the detected loads BF3 in the left and right hydraulic cylinders 11L, 11R, the mechanical deflections H2, HR2 of the left and right side frames are calculated (step S16).

Then, based on the theoretical mechanical deflections H1, HR1 calculated in step S13 and the mechanical deflections H2, HR2 due to the detected loads, calculated in step S16, differences in the left and right mechanical deflections ΔHL, ΔHR are calculated (step S17).

Next, based on the above difference in deflection ΔHL, ΔHR, the deflection in the lower apron (ΔHA1, ΔHA2, ΔHA3) are calculated (step S18).

The deflections in the lower apron (ΔHA1, ΔHA2, ΔHA3) are deflections at the positions corresponding to the left side, the center portion and the right side of the work W upon bending processing thereof and expressed in the following formulae:

$$\Delta HA1 = \Delta HL + (\Delta HR - \Delta HL) \times K_6$$

$$K_6 = f(B, BP, A1)$$

$$\Delta HA2 = \Delta HL + (\Delta HR - \Delta HL) \times K_7$$

$$K_7 = f(B, BP, A2)$$

$$\Delta HA3 = \Delta HL + (\Delta HR + \Delta HL) \times K_8$$

$$K_8 = f(B, BP, A3)$$

B: bending length of the work W
BP: absolute value of the amount of offset of the work W from the center portion of the press brake
A1–A3: angle, $K_6$–$K_8$: coefficient By correcting the amounts of deflection in the longitudinal direction of the lower apron calculated as described above ($\Delta HA1$, $\Delta HA2$, $\Delta HA3$), expected angles A1', A2', A3' which are expected at the left side, the center portion, and the right side of the work W after bending processing are calculated (step S19). The above expected angles A1', A2' and A3' are expressed in the following formulae:

$$A1' = f[n, V, A1, \Delta HA1]$$

$$A2' = f[n, V, A2, \Delta HA2]$$

$$A3' = f[n, V, A3, \Delta HA3]$$

Next, for crowning correction for the slower apron (means curving the lower apron downward), first a crowning correction angle $\Delta A2$ is calculated (step S20). This crowning correction refers to making the lower apron substantially horizontal upon bending processing of the work W by preliminarily curving upward the lower apron inclined to be curved downward at that time, so as to ensure substantially equal bending angles throughout the bending length B of the work W.

This crowning correction angle $\Delta A2$ is calculated as follows. That is, a difference between a mean of the expected angles (A1', A3') of the left and right sides or (A1'+A3')/2 and an expected angle in the center portion (A2') is obtained.

$$\Delta A2 = A2' - (A1' + A3')/2$$

Then, this crowning correction angle $\Delta A2$ is converted to upward deflection $\Delta Y$ of the lower apron at the center portion thereof (step S21). This deflection $\Delta Y$ is expressed as follows:

$$\Delta Y = f[V, n, A2', \Delta A2]$$

After the upward deflection $\Delta Y$ at the center portion of the lower apron is calculated as described above, a correction value CC for obtaining a crowning pressure CP necessary for deflecting the center portion of the lower apron by the amount of deflection $\Delta Y$ is obtained (step S22).

The above crowning pressure CP is obtained by multiplying a sum of the pressures of the left and right hydraulic cylinders 11L, 11R by the correction value CC, and can be expressed in the following formula:

$$CP = (PL + PR) \times CC$$

The above correction value CC is a coefficient for relating a hydraulic pressure to be supplied to be crowning cylinder 13 equipped at the lower apron to pressures in the left and right hydraulic cylinders 11L, 11R, respectively. Appropriate correction values CC are preliminarily obtained experimentally corresponding to a sum of the pressures in the left and right hydraulic cylinders 11L, 11R and stored in the data table 47.

Thus, the correction value CC is obtained from the data table and then based on the detected pressures of the left and right hydraulic cylinders 11L, 11R detected through the pressure sensors PS, the crowning pressure CP is calculated. After that, pressure control valves (not shown) disposed on a connecting circuit (not shown) between the hydraulic pump P and the crowning cylinder 13 are controlled to adjust the crowning pressure CP applied to the crowning cylinder 13 so that it is CP=(PL+PR)×CC.

The above correction value CC may be calculated based on an experimental formula which is preliminarily determined.

Next, assume that the work W is bent with the crowning pressure CP applied to the crowning cylinders 13 as described above. Then, the bending angles A'1, A'3 at both the sides of the work W at this time are calculated (step S23). In this case, the bending angles A'1, A'3 are expressed in the following formulae.

$$A'1 = f[n, V, \Delta Y, CC, A1']$$

$$A'3 = f[n, V, \Delta Y, CC, A3']$$

Then, the D value correction amounts XL, XR at both the left and right sides of the work W are calculated regarding the bending angles A'1, A'2 of both the sides thereof calculated as described above as a target angle A (step S24). This D value correction amounts XL, XR can be expressed in the following formulae.

$$XL = f[n, A, V, A'1, K_9, B, BP]$$

$$XR = f[n, A, V, A'3, K_{10}, B, BP]$$

$K_9$, $K_{10}$: coefficient

Next, based on the detected load BF3 calculated on the above step S15, a load corrective value BFN in a case when the detected angles A1, A3 in the work W are corrected to the target angle A is calculated (step S25). Then, based on this load corrective value BFN, the left and right mechanical deflections HLN, HRN are calculated (step S26).

Meantime, the load corrective value BFN is expressed in the form of BFN=f[BF3, $K_{11}$]($K_{11}$ is a coefficient).

Based on the left and right mechanical deflections HLN, HRN and the mechanical deflection H calculated on the above step S3, the left and right deflection correction amounts $\Delta HLN$, $\Delta HRN$ are calculated (step S27). These left and right deflection amounts $\Delta HLN$, $\Delta HRN$ can be obtained in the following formula. If the work W is located in the center, the left and right mechanical deflections become equally H and if the work W is located to the left or the right, the left and right mechanical deflections become HL and HR respectively.

$$\Delta HLN = HLN - H (\text{or } HL)$$

$$\Delta HRN = HRN - H (\text{or } HR)$$

After the left and right deflection correction amounts $\Delta HLN$, $\Delta HRN$ are calculated as described above, based on the theoretical D value D1 calculated on the step S4, the D value correction values XL, XR calculated on the step S24, and the aforementioned deflection correction amounts $\Delta HLN$, $\Delta HRN$, the left and right D value instructive values DL, DR are calculated (step S28).

The instructive values DL, DR are expressed in the following formula.

$$DL = D1 + XL + \Delta HLN$$

$$DR = D1 + XR + \Delta HRN$$

Based on these obtained instructive values DL, DR, the left and right servo motors SM are controllably rotated to adjust the vertical positions of the left and right nut members 29. Then, the processing returns to step S6, in which the work W is bent. Until the angles are acceptable on step S9, the respective steps of steps S6–S28 are repeated.

If the angles are acceptable on the step S9, it means that the instructive values DL, DR are accurate values. Thus, without moving the left and right nut members 29, a necessary quantity of the works W are bent to produce excellent precision products.

Meantime, if the angles are acceptable on the step S9 upon bending processing of the work W, data about relations between the work information of the work W, the bending angles and the positions of the nut members 29 are stored in the memory 45 in the form of a data table. When the same works are to be bent at the same angle, position data about the nut member 29 is read from a preliminarily stored data table and then the position of the works are controlled according to that data, so that the bending processing thereof can be achieved easily.

As for the degree of opening of the upper limit valves 21, data about a relation between a pressure to be applied to the hydraulic cylinders 11L, 11R and the degree of opening J is preliminarily obtained through experiments to form a data table. Based on a load for bending the work W, a pressure to be applied to the hydraulic cylinders is calculated and then based on this pressure, an appropriate degree of opening J is retrieved from the data table 51.

At this time, a temperature sensor TS is provided to detect the temperature of a pressurized oil to be supplied to the hydraulic cylinders. Corresponding to this detected temperature, a viscosity correction coefficient is retrieved from the viscosity correction coefficient data table 53. Then, based on this retrieved viscosity correction coefficient, the degree of opening of the upper limit valve 21 is corrected.

As for the deflection T of the dies, data about a relation between the deflection T of the dies upon applying a load necessary for the bending processing of the work W with the upper tool and lower die engaged with each other, and a corresponding load is preliminarily obtained through experiments to form a data table. The deflection of the dies can be retrieved from this data table.

Figure 18:
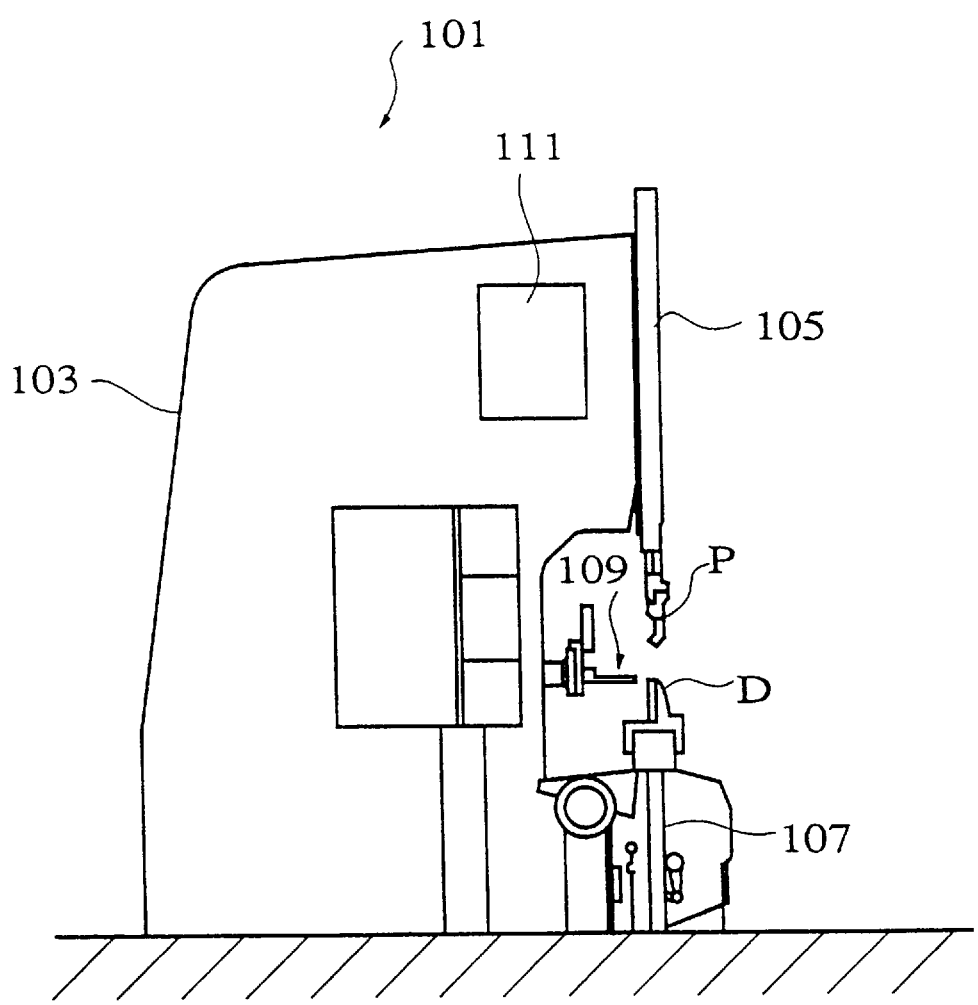
FIG. 18 is a side view of the press brake according to an embodiment of the present invention.

Referring to FIG. 18, generally a press brake 101 comprises side frames 103 stood on the left and right sides thereof. An upper table 105 is fixed to the upper front of the side frame and a lower table 107 vertically movable by hydraulic cylinders (not shown) provided on the left and right sides is provided on the lower front of the side frame 103.

A punch P is provided on the bottom of the upper table 105 and a die D opposing the punch P is provided on the top of the lower table 107. Further, a back gauge 109 movable longitudinally (left-and-right direction in FIG. 11) between the side frames 103 is provided. Further, a control unit 111 for controlling the press brake 101 is provided on the side of the side frame 103.

In the above-described construction, the press brake 101 is controlled by the control unit 111 to move the back gauge 109 longitudinally and position it at a desired position, such that it strikes and stops one end of the work W. With this condition, by actuating the left and right hydraulic cylinders (not shown), the lower table 107 is moved vertically so as to bend the work W in cooperation between the punch P and the die D.

Figure 8:
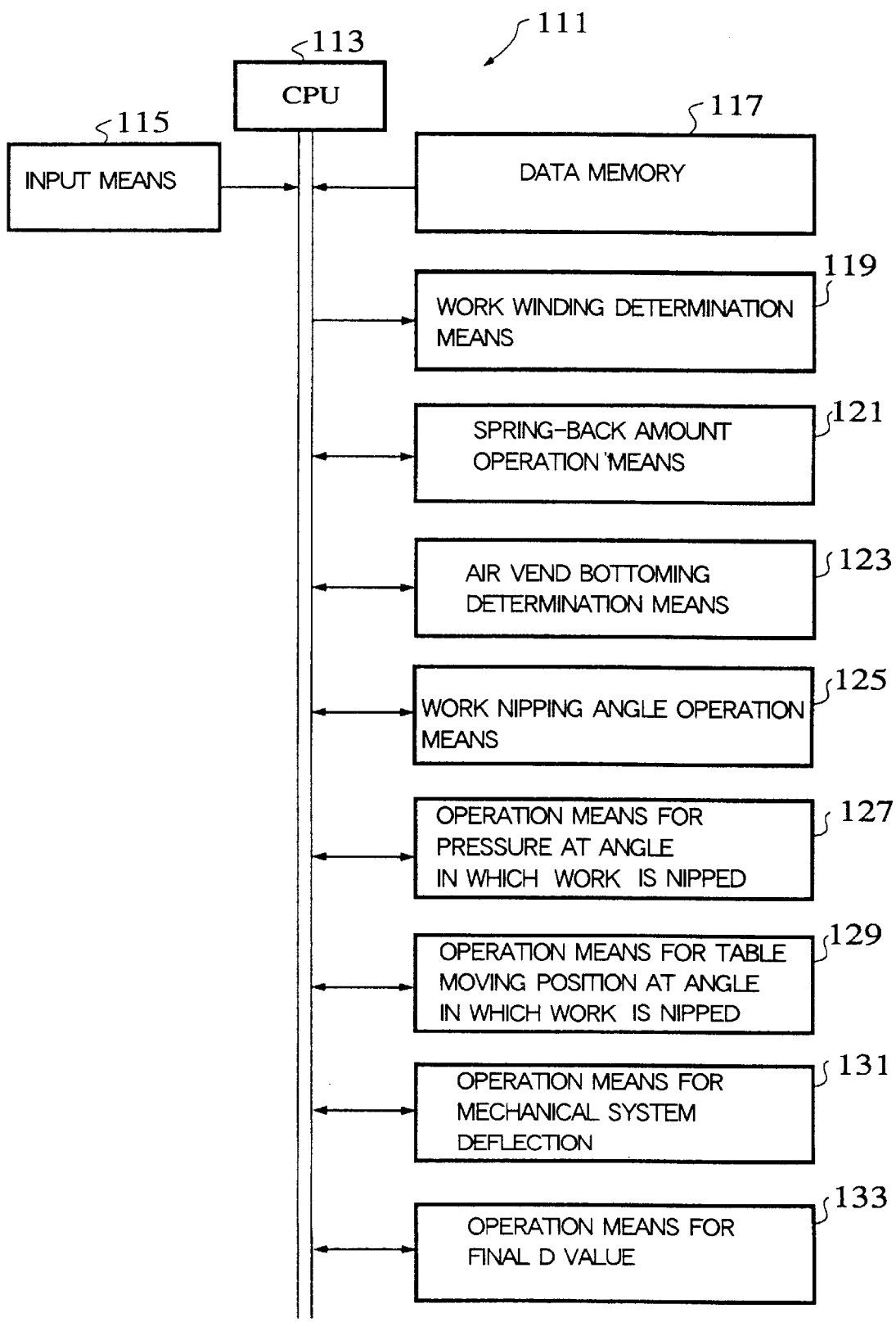
FIG. 8 is a configurational block at the time of air bend in the control unit of the press brake according to the present invention.

FIG. 8 shows a block diagram of the construction of the control unit 111 upon bending the work by air bend. Referring to FIG. 8, the control unit 111 comprises a CPU 113, to which an input means 115 comprising a keyboard for inputting such data as work material, internal radius of work angle (IR), tensile strength (S), work thickness (t), bending length (B), V width of die D (V), shoulder radius of die D (DR), angle of die D (DA), tip radius of punch P (PR), tip angle of punch P (PA), bending angle (A), offset (BP) and the like is connected and a data memory 117 for storing the above various data input by this input means is also connected.

The CPU 113 is connected to work winding determination means 119, spring-back amount operation means 121, air bend bottoming determination means 123, work angle pinching operation means 125, operation means for pressure applied at angle which work is pinching 127, operation means for table moving position at angle in which work is pinching 129, operation means for mechanical system deflection 131, and operation means for final D value 133.

Figure 9:
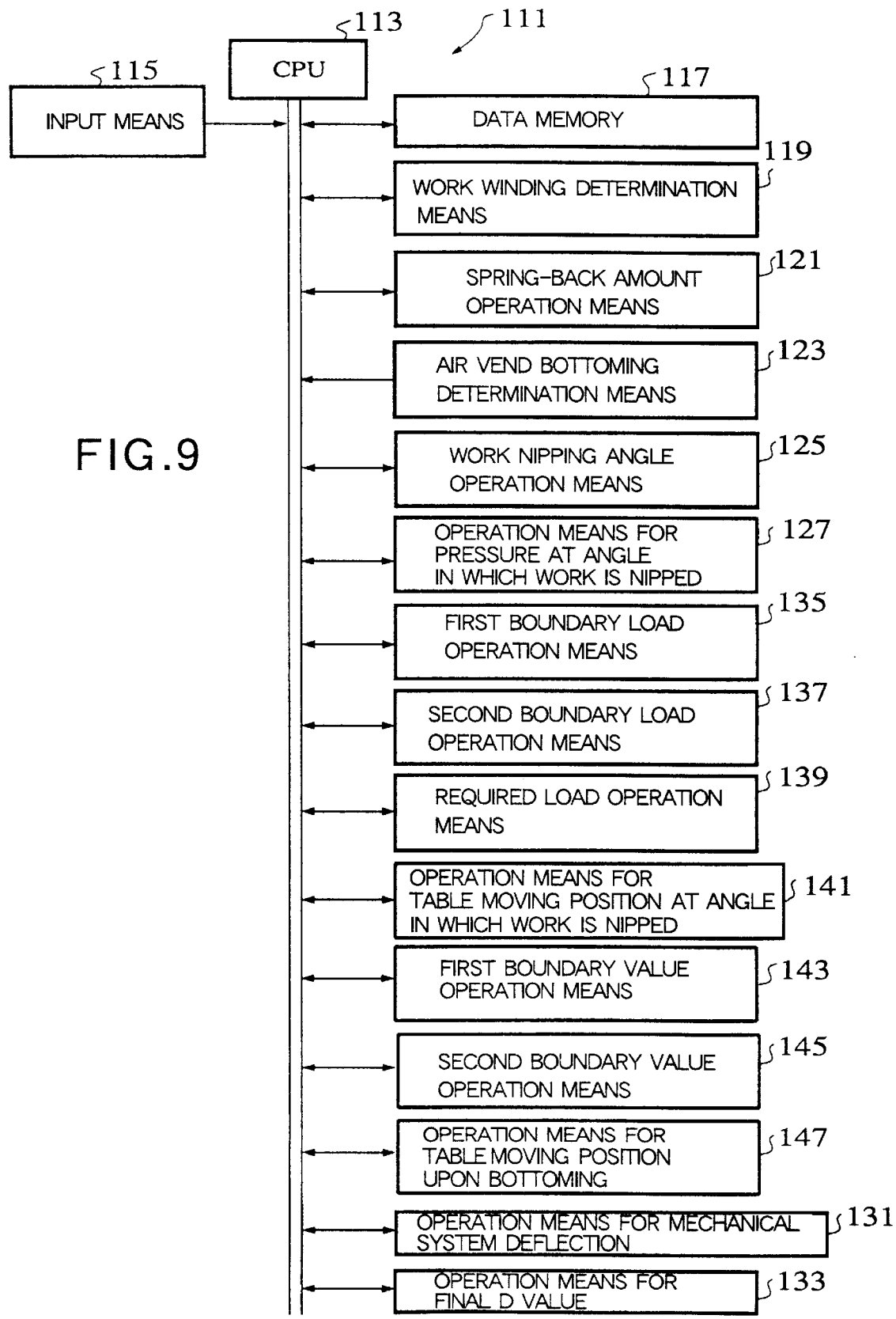
FIG. 9 is a configurational block at the time of bottoming in the control unit of the press brake according to the present invention.

FIG. 9 shows a block diagram of the construction of the control unit 111 upon bending the work by bottoming. In FIG. 9, the same reference numerals are attached to the same parts as those in FIG. 8 and a description thereof is omitted. In FIG. 9, the CPU 113 is connected to first boundary load operation means 135, second boundary load operation means 137, required load operation means 139, operation means for table moving position at angle in which work is pinched 141, first boundary value operation means 143, second boundary value operation means 145, and operation means for table moving position upon bottoming 147.

Figure 10A:
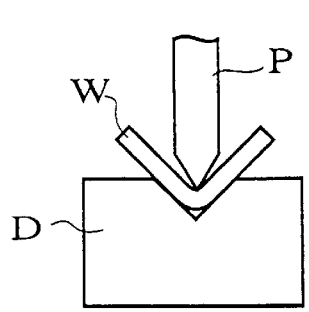
FIGS. 10A and 10B are explanatory diagrams for determining whether a work winds around the tip of the punch.
Figure 10B:
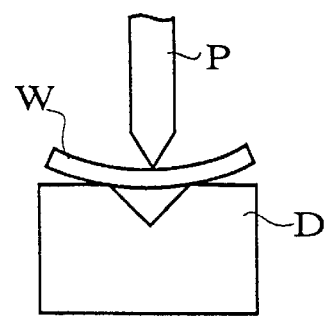

Referring to FIG. 8, the work winding determination means 119 fetches a die condition stored in the data memory 117 and determines whether or not the work W winds around the tip of the punch P. As shown in FIG. 10A for example, with a condition that the work material is SPCC, the V width of the die D is 6 mm, and the tip radius of the punch P is 1.0 mm, it is determined that the work W winds around the tip of the punch P. As shown in FIG. 10B, with a condition that the work material is SPCC, the V width of the die D is 6 mm and the tip radius of the punch P is 0.2 mm, it is determined that the work W winds does not wind around the tip of the punch P. That is, if the tip radius (PR) of the punch P is larger than the internal radius (IR) which is the angle of the work W (PR≧IR), it is determined that the work W winds therearound. If the tip radius (PR) of the punch P is smaller than the internal radius (IR) which is the angle of the work W (PR<IR), it is determined that the work W does not wind therearound.

The spring-back amount operation means 121 calculates a spring-back amount $\Delta A_{a2}$ according to a plasticity theoretical formula shown below in a case when the work W winds therearound.

$$\Delta A_{a2} = \frac{K'}{EI}\left(PR + \frac{t}{2}\right) \cdot f(\psi_1) + \frac{K'}{KI}\int_{\psi_1}^{\theta} f(\theta)d\theta \tag{1}$$

Where E: Young's modulus, I: section secondary moment, PR: tip radius of punch, t: work thickness, K': material coefficient, $\psi_1$: winding angle, $\theta$: winding angle.

If the work does not winds therearound, by changing some values in the formula (1), the spring-back amount $\Delta A_{a1}$ is calculated in the same manner.

The air bend/bottoming determination mean 123 determines whether air bend or bottoming occurs according to the following formula.

$$A - \Delta A_{a2}(\Delta A_{a1}) \geq DA \tag{2}$$

$$A - \Delta A_{a2}(\Delta A_{a1}) < DA \tag{3}$$

Where A: target angle, $\Delta A_{a2}(\Delta A_{a1})$: spring-back amount, DA: angle of die D.

If the formula (2) is satisfied, it is determined that air bend occurs. If the formula (3) is satisfied, it is determined that bottoming occurs.

Figure 11A:
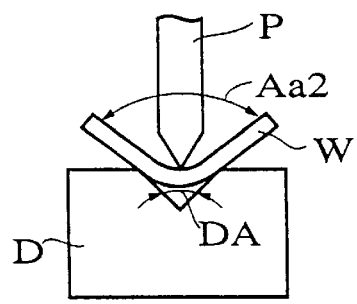
FIGS. 11A and 11B are diagrams for explaining the work pinching angle.
Figure 11B:
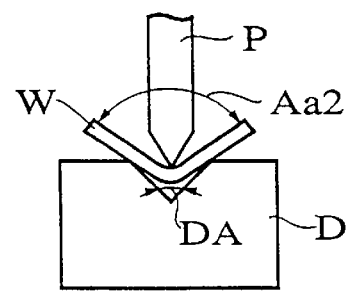

The work (i.e., workpiece) pinching angle operation means 127 calculates work pinching angles ($A_{a2}$, $A_{a1}$) as shown in FIGS. 11(A), (B) according to the following formula.

$$A_{a2}(A_{a1})=A-\Delta A_{a2}(\Delta A_{a1}) \qquad (4)$$

Where A: target angle, $\Delta A_{a2}(66 A_{a1})$: spring-back amount

The operation means for pressure applied at angle in which work is pinched 127 calculates a load $Bf_{a2}(Bf_{a1})$ applied at angle $A_{a2}(A_{a1})$ in which the work W is pinched according to the following plasticity theoretical formula.

$$BF_{a2} = \frac{K'f(n) \times f(L)}{1000 \times f(\theta)} \quad [\text{ton}] \qquad (5)$$

Where n: material constant, L: die function $Bf_{a1}$ is also calculated by changing the values of n, L in the formula (5) in the same manner.

The operation means for table moving position at angle in which work is pinched 129 calculates a table moving position at angle in which work is nipped $d_{a2}$ ($d_{a1}$) in the following plasticity theoretical formula.

$$d_{a2}=L\times[\{\Phi_3(\theta)-\Phi_3(\psi_1)\}\times f(\theta)+f(\psi_1)]-t \qquad (6)$$

Where L: die function, $\Phi_3(\theta)$: integration function, $\Phi_3(\psi_1)$: integration function, t: work thickness $d_{a1}$ is also calculated by changing some values in the formula (6) in the same manner.

The mechanical system deflection means 131 calculates deflection $\delta_6$, valve angle J, opening of jaw G and die deflection T according to the following plasticity theoretical formula.

$$\delta_6 = \{H_1 \times BP + H_2\} + \frac{BF_{a2}}{B} \qquad (7)$$

$$J = K_1 \times BF_{a2}^2 \times K_2 \times BF_{a2} + K_3 \qquad (8)$$

$$G = K_4 \times BF_{a2} \qquad (9)$$

$$T = K \times \frac{BF}{B} \qquad (10)$$

Where $H_1$, $H_2$: mechanical constant, BP: offset amount, B: bending length, $K_1$–$K_4$: mechanical constant, K: deflection constant.

In a case when the work does not wind therearound, $Bf_{a1}$ is substituted for $Bf_{a2}$ in the formulas (7)–(10).

Figure 12:
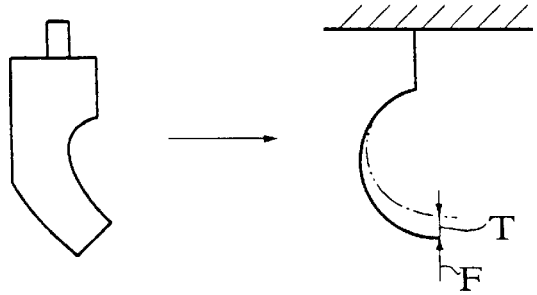
FIG. 12 is a diagram for explaining the deflection of a punch.

The table deflection T in the above formula (10) may be calculated by applying plasticity dynamics according to CAD information as shown in FIG. 12.

The spring-back amount operation means 121 in FIG. 9 calculates a spring-back amount $\Delta A_{b2}$ ($\Delta A_{b1}$) according to the following plasticity theoretical formula.

$$\Delta A_{b2} = \frac{K'}{EI}\left(PR+\frac{t}{2}\right)\cdot f(\psi_1) + \frac{K'}{EI}\int_{\psi_1}^{DA} f(\theta)d\theta \qquad (11)$$

Where E: Young's modulus, I: sectional secondary moment, PR: tip radius of punch P, t: work thickness, K': materials constant, $\psi_1$: winging angle, $\theta$: bending angle, DA: angle of die D.

The work (i.e., workpiece) pinching angle operation means 125 calculates work pinching angles ($A_{b2}$, $A_{b1}$) according to the following formula.

$$A_{b2}(A_{b1})=A-\Delta A_{b2}(\Delta A_{b1}) \qquad (12)$$

Where A: target angle, $\Delta A_{b2}(\Delta A_{b1})$: spring-back amount.

The operation means for pressure applied work is pinched upon bottoming 127 calculates a work pinching pressure (load) upon bottoming $BF_{b2}"(BF_{b1}")$ according to the following plasticity theoretical formula.

$$BF_{b2"} = \frac{2K'}{f(A_{b2})} \times \left(\frac{1}{PR+t/2}\right)^n \times \frac{1}{1000} \qquad (13)$$

Where $A_{b2}$: work pinching angle, PR: tip radius of punch P, t: work thickness. When calculating load $Bf_{b1}'$, $A_{b1}$ is used instead of $A_{b2}$.

The first boundary load operation means 135 and the second boundary load operation means 137 calculate boundary loads $BF_{b2}'(BF_{b1}')$ and $BF_{a2}'(BF_{a2}')$.

$$BF_{b2'} = \frac{2K'}{f(DA)} \times \left(\frac{1}{PR+t/2}\right)^n \times \frac{1}{1000} \qquad (14)$$

$$BF_{a2'} = \frac{K'f(n) \cdot f(L)}{1000 \times f(DA)} \qquad (15)$$

Where DA: angle of die D, K': constant

The required load operation means 139 calculates a required load $BF_{b2}(BF_{b1})$ according to the following formula.

$$FB_{b2} = BF_{a2'} \times \frac{BF_{b2"}}{BF_{b2'}} \qquad (16)$$

Figure 14:
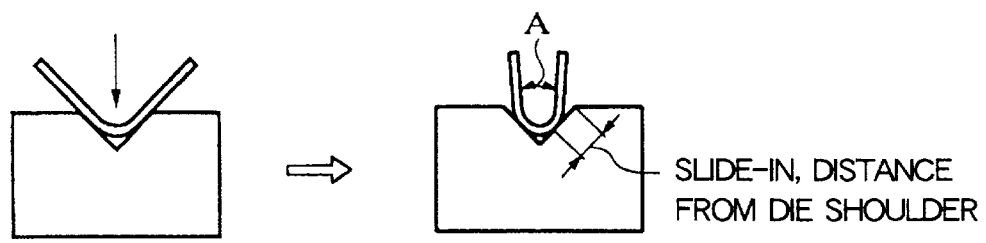
FIG. 14 is a diagram for explaining a slide-in of the work through a die shoulder.

That is, with respect to a relation between air bend area and bottoming area, in the formula for applied pressure (load) in air bend and bottoming, the relation may be sometimes uncontinuous across for example 91 degrees. The required load operation means 139 calculates a required load $BF_{b2}(BF_{b1})$ by shifting bottoming formula to air bend formula. This is because the bottoming formula contains a variety of uncertain factors such as slide-in from the die shoulder of the work W as shown in FIG. 14, deformation of the work W in addition to error factors of the air bend. Thus, a required load ensuring a more excellent bending accuracy can be obtained by shifting to the air bend range.

The operation means for table moving position at angle in which work is pinched 141 a table moving position $d_{b2}"$ ($d_{b1}"$) at angle in which work is pinched according to the following plasticity theoretical formula.

$$d_{b2}" = Y_2" + (L - X_2")\tan\alpha - t \qquad (17)$$

$$Y_2" = \int_0^\psi 1f(L)\sin d\theta + \int_{\psi_1}^\alpha f(\beta x,\theta)d\theta \qquad (18)$$

$$X_2" = \int_0^\psi 1f(L)\cos d\theta + \int_{\psi_1}^\alpha f'(\beta x,\theta)d\theta \qquad (19)$$

Where L: angular function of die D, $\beta x$: overbend amount $d_{b1}"$ can be also obtained in the same manner.

The first boundary value operation means 143 can obtain a boundary value $d_{b2}'(d_{b1}')$ according to the following plasticity theoretical formula.

$$d_{b2}'=Y_2'+(L-X_2')\tan\alpha - t \qquad (20)$$

Where $Y_2'$, $X_2'$ are values obtained when $\beta x=0$ in the cases of $Y_2"$ and $X_2"$. $d_{b1}'$ can be also obtained in the same manner.

The second boundary value operation means 145 can obtain a boundary value $d_{a2}'(d_{a1}')$ by inputting $\theta$: die angle and $\psi_1=f(A)$ in A=DA (die angle) (where $\psi$: winding angle).

The operation means for table moving position upon bottoming 147 can obtain $d_{b2}(d_{b1})$ according to the following formula.

$$d_{b2}' = Y_2' + (L - X_2') \tan \alpha - t \qquad (20)$$

$d_{b1}$ can be also obtained in the same manner.

Figure 15:
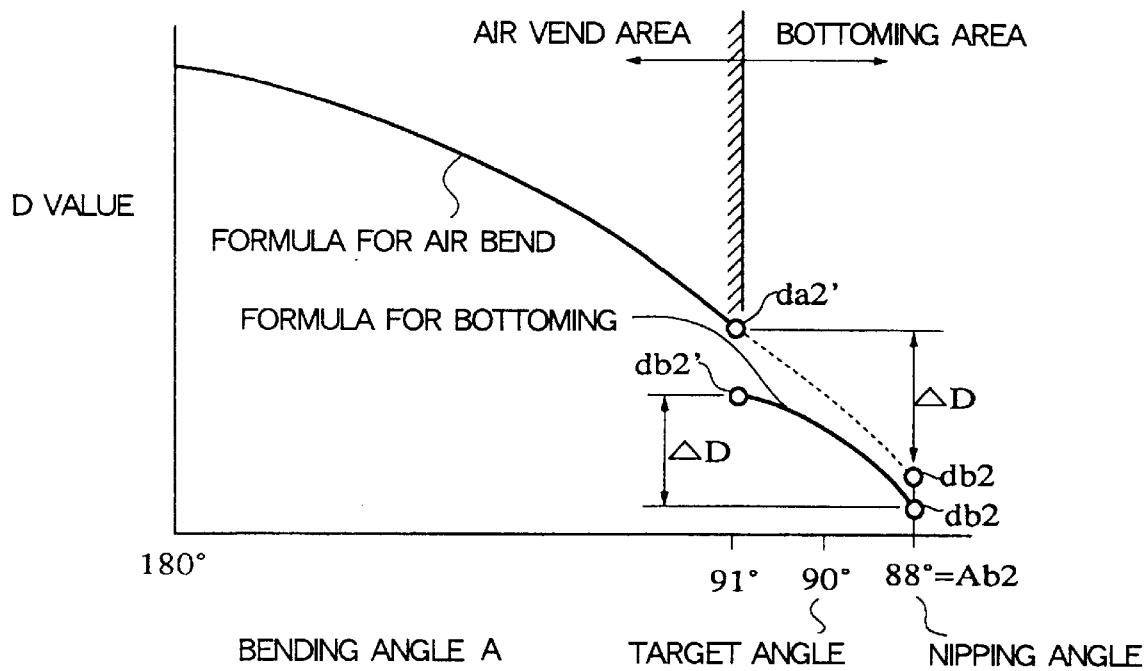
FIG. 15 is a diagram for explaining a relation between air bend and bottoming in a relation between the D value and bending angle.

That is, the operation means for table moving position at angle in which work is pinched 141 obtains a table moving position at angle in which work is pinched $d_{b2}''$ according to the bottoming formula as shown in FIG. 15. The first boundary value operation means 143 and the secondary boundary value operation means 145 obtain a boundary value $d_{b2}'$ of the bottoming area relative to the air bend area and a boundary value $d_{a2}'$ in the air bend area according to the bottoming formula and the air bend formula respectively. Further, the operation means for table moving position upon bottoming 147 obtains a table moving position $d_{b2}$ upon bottoming by shifting the boundary value $d_{b2}'$ to the boundary value $d_{a2}$ as shown in FIG. 15.

Figure 16:
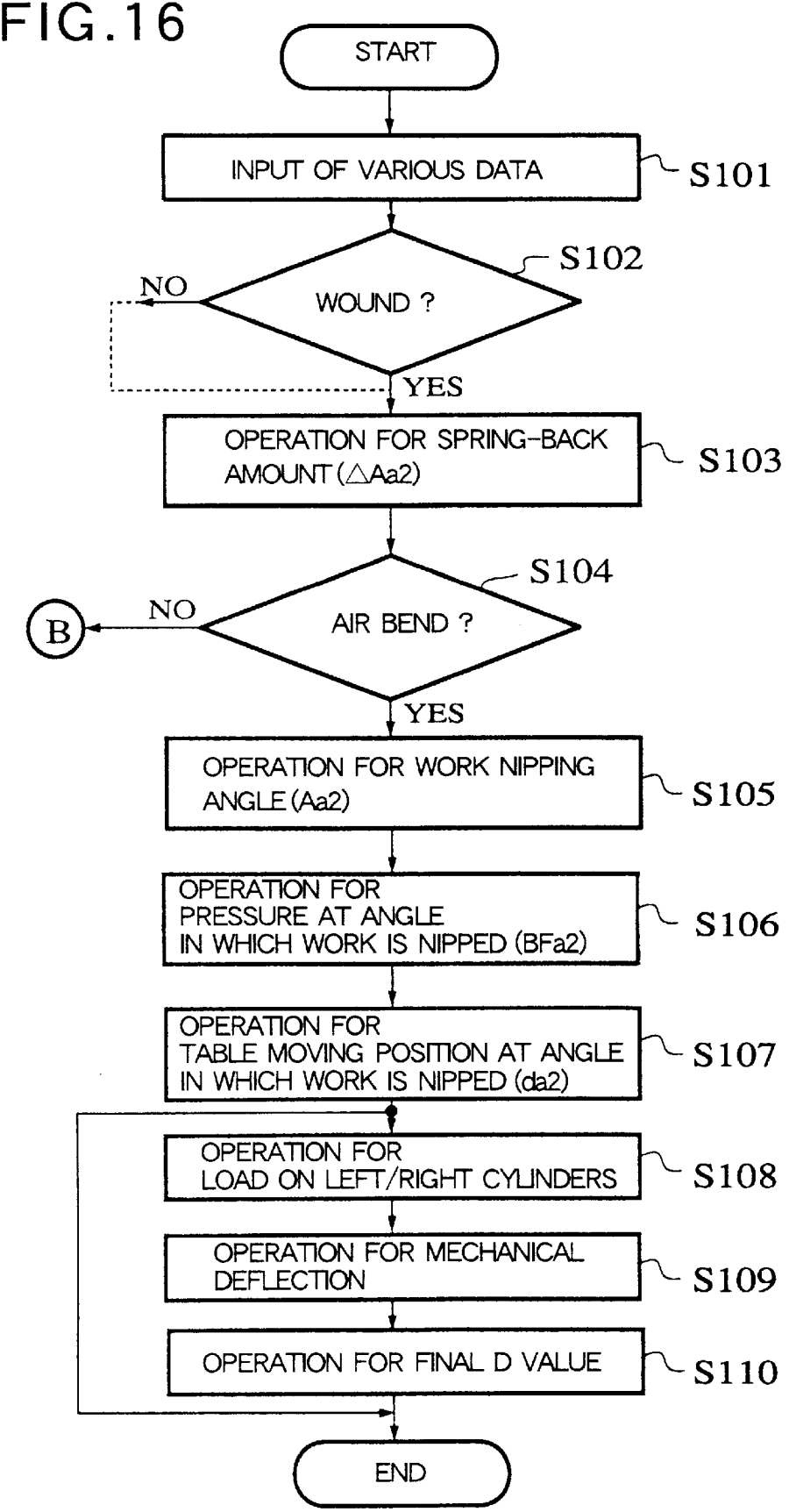
FIG. 16 is a diagram for explaining the operation of the present invention.

An operation for determining a D value from the shoulder bottom of die D to the tip of the punch P will be described on the basis of a flow chart shown in FIGS. 16, 17. First, on step S101, a variety of data such as the material of the work W, tensile strength, work thickness and the like are input through the input means 115 and temporarily stored in the data memory 117. On step S102, the work winding determination means 119 determines whether the work W winds around the tip of the punch P. That is, in a case of PR≧IR, it is determined that the work W winds around the tip of the punch P. In a case of PR<IR, it is determined that the work W winds around the tip of the punch P.

If the work W winds around the tip of the punch P, the spring-back amount operation means 121 calculates a spring-back amount $\Delta A_{a2}$ on step S103. On step S104, the air bend/bottoming determination means 123 determines whether air bend or bottoming occurs. That is, if the above formula (2) is satisfied, it is determined that air bend occurs. If the above formula (3) is satisfied, it is determined that bottoming occurs.

On step S105, the work pinching angle operation means 125 calculates a work pinching angle $A_{a2}$ according to the above formula (4). On step S106, the operation means for pressure applied at angle in which work in pinched 127 calculates a pressure applied at angle in which work is pinched $Bf_{a2}$ according to the above formula (5). On step S107, the operation means for table moving position at angle in which work is pinched 129 calculates a table moving position $d_{a2}$ at angle in which work is pinched according to the formula (6). Then, in a case when mechanical deflection is not taken into account, this table moving position $d_{a2}$ at angle in which work is pinched is regarded as a D value and then the processing is terminated.

If mechanical deflection is taken into account, on step S108, the left and right hydraulic cylinder loads are calculated. That is, the left and right hydraulic cylinder loads $BF_L$, $BF_R$ are calculated based on the $Bf_{a2}$ and offset amount BP. On step S109, the mechanical deflection operation means 131 calculates various mechanical deflections according to the formulas (7)–(10). On step S110, the final D value operation means 133 calculates a final D value according to $D = d_{a2} + \delta_6 + J + G + T$. By this calculated final D value, the left and right hydraulic cylinders are controlled to adjust the vertical position of the lower table 107, thereby making it possible to improve the bending angle accuracy corresponding to various bending conditions and reduce the frequency of corrections.

Figure 17:
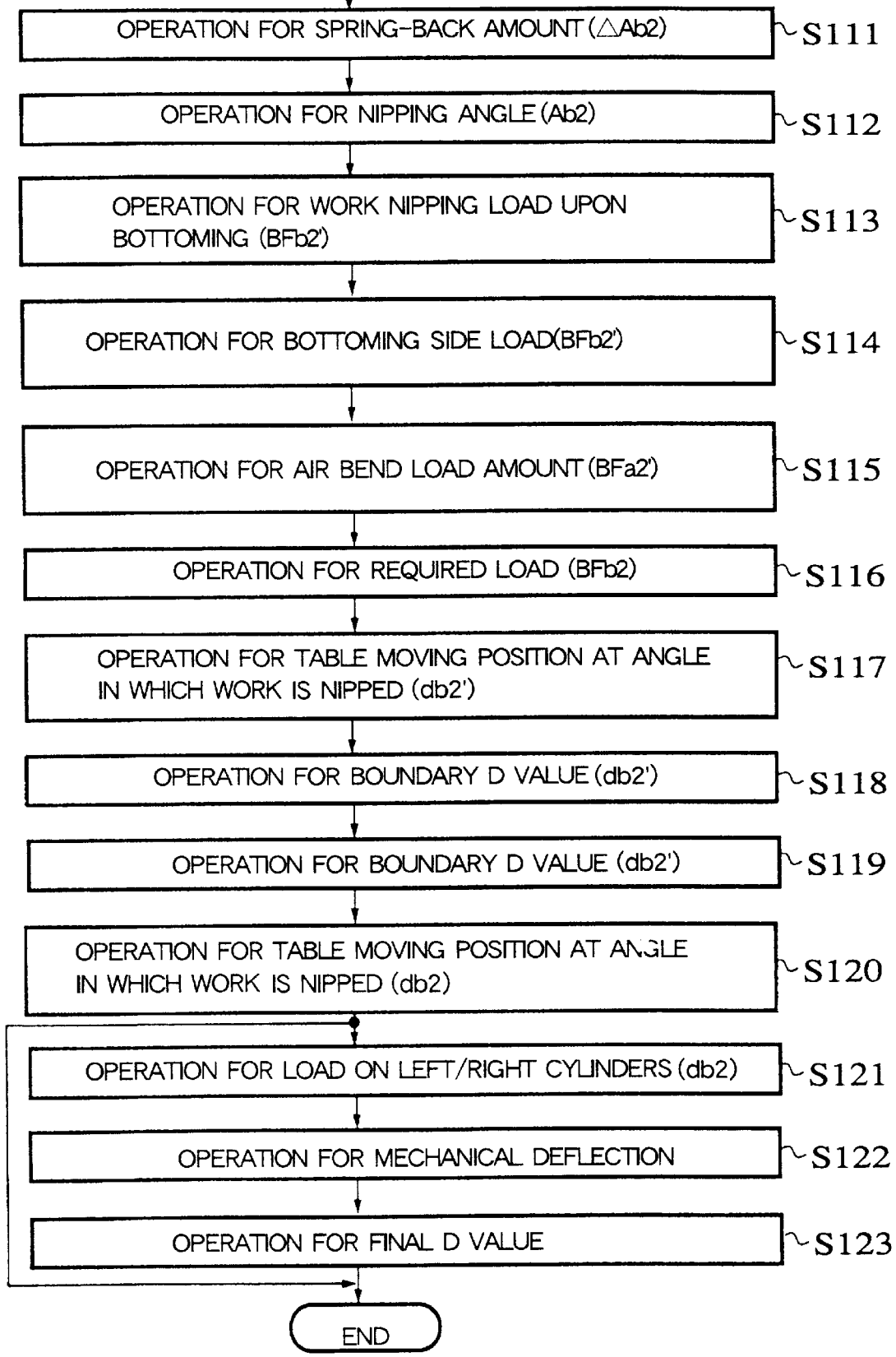
FIG. 17 is a diagram for explaining the operation of the present invention.

If it is determined that bottoming occurs on the step S104, a corresponding processing is conducted according to a flow chart shown in FIG. 17. On step S111 in FIG. 17, the spring-back amount operation means 121 calculates the spring-back amount $\Delta A_{b2}$ according to the formula (11).

On step S112, the work pinching angle operation means 125 calculates a work pinching angle $A_{b2}$ according to the formula (12). On step S113, the operation means for pressure applied at angle in which work is pinched 127 calculates a load $Bf_{b2}''$ at angle in which the work, is pinched according to the formula (13). On step S114, the first boundary load operation means 135 calculates a bottoming side load $Bf_{b2}'$ according to the formula (14) and on step 115, the second boundary load operation means 137 calculates an air bend side load $Bf_{a2}'$ according to the formula (15).

Figure 13:
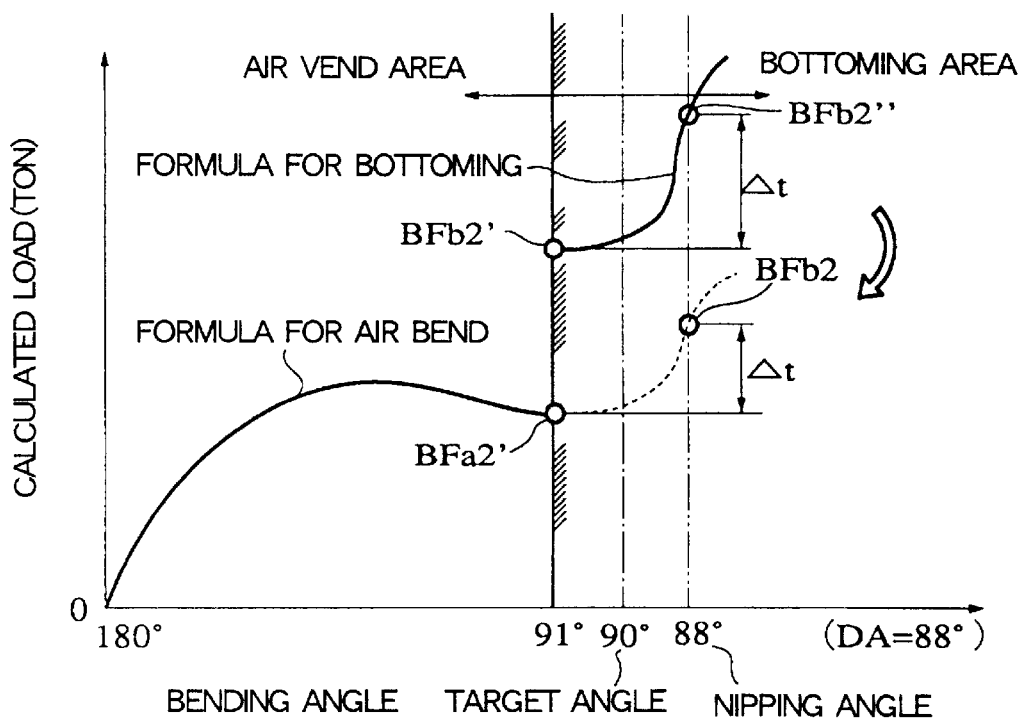
FIG. 13 is a diagram for explaining a relation between air bend and bottoming in a relation between bending angle and theoretical load.

On step S116, the required load operation means 139 calculates a required load $Bf_{b2}$ according to the formula (16). With respect to FIG. 13, the bottoming formula is shifted to air bend side. On step S117, the operation means for table moving position at angle in which the work in pinched 141 calculates a table moving position at angle in which the work in pinched $db_2''$ according to the formulas (17), (18), (19). On step S118, the first boundary value operation means 143 calculates a boundary D value $d_{b2}'$ according to the formula (20). Then, on step S119, the second boundary value operation means 145 calculates a boundary D value $d_{a2}'$ according to the formula (6). Further, on step S120, the operation for table moving position upon bottoming $d_{b2}$ calculates a table moving position upon bottoming $d_{b2}$ according to the formula (21). That is, with respect to FIG. 15, the bottoming formula is shifted to the air bend formula. If mechanical deflection is not taken into account, this table moving position at angle in which the work is pinched $d_{b2}$ is regarded as D value and the processing is terminated.

In the case when mechanical deflection is taken into account, on step S121, the left and right hydraulic cylinder loads are calculated. That is, the left and right hydraulic cylinder loads $BF_L$, $BF_R$ are calculated on the basis of the $Bf_{b2}$ and the offset amount BP. On step S122, the mechanical system deflection operation means 131 calculates various mechanical system deflections according to the formulas (7)–(10). On step S123, the final D value operation means 133 calculates a final D value according to $D - d_{b2} + \delta_6 + J + G + T$. According to this calculated final D value, the left and right hydraulic cylinders are controlled to adjust the vertical position of the lower table 107 thereby making it possible to bend the work, producing the same effect as described previously.

on step S102, it is determined that the work W does not wind around the tip of the punch P, it is also possible to calculate a D value at the time of bottoming by obtaining $\Delta A_{a1}$, $Bf_{a1}$, $d_{a1}$, $BF$, $\Delta A_{b1}$, $A_{b1}$, $Bf_{b1}''$, $Bf_{b1}'$, $Bf_{a1}'$, $Bf_{b1}$, $d_{b1}''$, $d_{b1}'$, $d_{a1}'$, and $d_{b1}$ following the procedures of steps S103 to S123. Thus, a detailed description is omitted. However, a step of obtaining a temporary load BF is inserted before a step of obtaining a spring-back amount $\Delta A_{b1}$.

Meanwhile, this invention is not restricted to the above described embodiments but can be achieved in the other embodiments also by appropriate modifications.

As recognized in the above description of the embodiments, according to the present invention, the D value indicating the theoretical engagement positional relation between the upper tool and lower die is calculated on the basis of work information, die information and bending information, then the above engagement positional relation is controlled on the basis of this calculated D value to actually bend the work, then bending angles at plural positions of the work are measured to obtain the mean value, then a theoretical load for bending according to the mean value of those bending angles is calculated and finally a theoretical mechanical deflection is calculated according to this theoretical load.

Further, the actually applied pressures at the left and right hydraulic cylinders at the time of actual bending of the work are detected and based on this actually applied pressures, actual mechanical deflections are calculated.

Then, based on a difference between the theoretical mechanical deflection and the actually mechanical deflection, a corrective value of the above D value is calculated and then this corrective value is added to the D value to correct the engagement positional relation between the upper tool and lower die in order to achieve bending processing.

That is, after mechanical deflection is theoretically calculated and at the same time, the engagement positional relation between the upper tool and lower die is calculated, the present invention is not constructed to achieve bending processing of the works only based on this operation results. But according to the present invention, after a single bending processing is conducted, a bending angle is detected and based on this detected bending angle, mechanical deflection is again theoretically calculated and at the same time, a pressure in the hydraulic cylinder at the time of actual bending processing is detected. Then, based on the detected load, actual mechanical deflection is calculated and the based on a difference between the theoretical mechanical deflection and the actual mechanical deflection, the engagement positional relation between the upper tool and lower die is corrected and then the bending processing of works is achieved. Thus, even if there is any error in the theoretical mechanical deflection calculated initially, it is corrected and ultimately the bending processing of the works is achieved accurately.

Thus, even if there is any error in initial setting, accurate bending processing thereof can be achieved without any troubles.

Further, the actual mechanical deflection is calculated by detecting pressures in the left and right hydraulic cylinders and the left and right hydraulic cylinders are controlled separately to achieve the bending processing of the works. Thus, even if a work is deviated in terms of the position from the center of the table, the present invention can cope with this situation easily.

Further, according to the present invention, the D value of a distance from the bottom of the die to the tip of the punch is calculated accurately to control the table. Thus, it is possible to improve the accuracy in bending angle corresponding to a variety of the bending conditions and reduce the frequency of correction procedure.

I claim:

1. A method of bending a sheet-shaped workpiece using a press brake in which said workpiece is pinched between an upper tool and a lower die while an engagement positional relationship between said upper tool and said lower die is controlled, said press brake further including an upper apron having said upper tool installed thereon, a lower apron having said lower die installed thereon and drive means for driving either one of said upper and lower aprons close to or apart from the other of said upper and lower aprons, and method comprising:

(a) calculating a theoretical D value indicating a theoretical engagement positional relationship between said upper tool and said lower die that corresponds to a target bending angle, according to workpiece information, die information and bending information;

(b) bending said workpiece while controlling said engagement positional relationship between said upper tool and said lower die, according to said theoretical D value;

(c) measuring bending angles of said workpiece at a plurality of positions after said bending and calculating a mean value of said bending angles;

(d) calculating a theoretical load value for bending said workpiece according to said mean value of said bending angles and calculating a theoretical mechanical deflection value based on said theoretical load value;

(e) detecting actual pressure applied on said drive means during said bending of said workpiece;

(f) calculating an actual mechanical deflection value based on said actual pressure;

(g) calculating a correction value for said D value according to a difference between said theoretical mechanical deflection value and said actual mechanical deflection value;

(h) correcting said engagement positional relationship between said upper tool and said lower die by adding said correction value to said D value and performing said bending of said workpiece again;

(i) repeating the above steps (c)–(h) until said mean bending angle of said workpiece reaches a value within a predetermined tolerance of said target bending angle;

(j) controlling said engagement positional relationship between said upper tool and said lower die such that said engagement positional relationship remains constant after said bending angle of said workpiece reaches said value constant after said bending angle of said workpiece reaches said value and repeating said bending a predetermined number of times in accordance with a quality of workpieces.

2. The method of bending a sheet-shaped workpiece using a press brake according to claim 1, wherein said drive means comprises a pair of hydraulic cylinders arranged on both sides of said lower apron, for driving said lower apron.

3. A method of bending a workpiece using a press brake while an engagement positional relationship between an upper tool and a lower die is controlled, said press brake further including an upper apron having said upper tool installed thereon, a lower apron having said lower die installed thereon, drive means for driving either one of said upper and lower aprons close to or apart from the other of said upper and lower aprons and crowning cylinders arranged under said lower apron to compensate for a downward curve during said bending, said method comprising:

calculating a theoretical D value indicating a theoretical engagement positional relationship between said upper tool and said lower die that corresponds to a target bending angle, according to workpiece information, die information and bending information;

bending said workpiece while controlling said engagement positional relationship between said upper tool and said lower die, according to said theoretical D value;

measuring bending angles of said workpiece at a plurality of positions after said bending and calculating a mean value of said bending angles;

calculating a theoretical load value for bending said workpiece according to said mean value of said bending angles and calculating a theoretical mechanical deflection value based on said theoretical load value;

detecting actual pressure applied on said drive means during said bending of said workpiece;

calculating an actual mechanical deflection value based on said actual pressure;

calculating a difference between said theoretical mechanical deflection value and said actual mechanical deflection value;

calculating an amount of deflection at a plurality of positions in a longitudinal direction of said lower apron in said press brake according to said difference between said theoretical deflection value and said actual mechanical deflection value and said bending angles of said workpiece at said plurality of positions, and converting said amount of deflection at said plurality of positions in said longitudinal direction to calculate bending angles at a plurality of corresponding positions of said workpiece;

calculating pressure to be applied on said crowning cylinders in said lower apron according to said calculated bending angles at said plurality of corresponding positions; and curving said lower apron upward by applying said calculated pressures on said crowning cylinders to perform said bending of said workpiece with said upper tool and said lower die.

4. A method of bending a workpiece using a press brake while an engagement positional relationship between an upper tool and a lower die is controlled, said press brake further including an upper apron having said upper tool installed thereon, a lower apron having said lower die installed thereon, drive means for driving either one of said upper and lower aprons close to or apart from the other of said upper and lower aprons and crowning cylinders arranged under said lower apron to compensate for a downward curve during said bending, said method comprising;

calculating a theoretical D value indicating a theoretical engagement positional relationship between said upper tool and said lower die that corresponds to a target bending angle, according to workpiece information, die information and bending information;

bending said workpiece while controlling said engagement positional relationship between said upper tool and said lower die, according to said theoretical D value;

measuring bending angles of said workpiece at a plurality of positions after said bending and calculating a mean value of said bending angles;

calculating a theoretical load value for bending said workpiece according to said mean value of said bending angles and calculating a theoretical mechanical deflection value based on said theoretical load value;

detecting actual pressure applied on said drive means during said bending of said workpiece;

calculating an actual mechanical deflection value based on said actual pressure;

calculating a difference between said theoretical mechanical deflection value and said actual mechanical deflection value;

calculating an amount of deflection at a plurality of positions in a longitudinal direction of said lower apron in said press brake according to said difference between said theoretical deflection value and said actual mechanical deflection value and said bending angles of said workpiece at said plurality of positions, and converting said amount of deflection at said plurality of positions in said longitudinal direction to calculate bending angles at a plurality of corresponding positions of said workpiece;

calculating pressure to be applied on said crowning cylinders in said lower apron according to said calculated bending angles at said plurality of corresponding positions;

calculating bending angles of both sides of said workpiece which are bent by applying said calculated pressures on said crowning cylinders, and calculating an amount of correction for said D value according to said calculated bending angles; and calculating an instructive value according to a correction amount for said D value and said theoretical D value and controlling said upper tool and said lower die according to said instructive values to perform said bending of said workpiece.

5. A method of bending a sheet-shaped workpiece using a press brake in which said workpiece is pinched between an upper tool and a lower die while an engagement positional relationship between said upper tool and said lower die is controlled, said press brake further including an upper apron having said upper tool installed thereon, a lower apron having said lower die installed thereon and drive means for driving either one of said upper and lower aprons close to or apart from the other of said upper and lower aprons, said method comprising:

(a) calculating a theoretical D value indicating a theoretical engagement positional relationship between said upper tool and said lower die that corresponds to a target bending angle, according to workpiece information, die information and bending information;

(b) calculating a theoretical load value according to said workpiece information, said die information and said bending information, and calculating a theoretical mechanical deflection value according to said theoretical load value;

(c) calculating an instructive D value indicating said engagement positional relationship between said upper tool and said lower die according to said theoretical D value and said theoretical mechanical deflection value and performing bending of said workpiece according to said instructive D value;

(d) measuring bending angles of said workpiece at a plurality of positions after said bending and calculating a mean value of said bending angles;

(e) calculating a theoretical load value for bending said workpiece according to said mean value of said bending angles and calculating a theoretical mechanical deflection value based on said theoretical load value;

(f) detecting actual pressure applied on said drive means during said bending of said workpiece;

(g) calculating an actual mechanical deflection value based on said actual pressure;

(h) calculating a correction value for said instructive D value according to a difference between said theoretical mechanical deflection value and said actual mechanical deflection value;

(i) correcting said engagement positional relationship between said upper tool and said lower die by adding said correction value to said D value and performing said bending of said workpiece again;

(j) repeating the above steps (d)–(i) until said mean value of said bending angle of said workpiece reaches an acceptable value within a predetermined tolerance of said target bending angle;

(k) controlling said engagement positional relationship between said upper tool and said lower die such that said engagement positional relationship remains constant after said mean value of said bending angle of said workpiece reaches said acceptable value and repeating said bending in accordance with a predetermined quantity of workpieces.

6. A press brake in which a sheet-shaped workpiece is pinched between an upper tool and a lower die while an engagement positional relationship between said upper tool and said lower die is controlled to perform bending of said workpiece, said press brake comprising:

means for calculating a theoretical D value indicating a theoretical engagement positional relationship between said upper tool and said lower die that corresponds to a target bending angle, according to workpiece information, die information and bending information;

means for bending said workpiece while controlling said engagement positional relationship between said upper tool and said lower die, according to said theoretical D value;

means for measuring bending angles of said workpiece at a plurality of positions after said bending and calculating a mean value of said bending angles;

means for calculating a theoretical load value for bending said workpiece at said mean value of said bending angles and calculating a theoretical mechanical deflection value based on said theoretical load value; and means for calculating a correction value for said theoretical D value according to said theoretical mechanical deflection value.

7. A press brake in which a sheet-shaped workpiece is pinched between an upper tool and a lower die while an engagement positional relationship between said upper tool and said lower die is controlled to perform bending of said workpiece, said press brake comprising:

an upper apron having said upper tool installed thereon;

a lower apron having said lower die installed thereon;

drive means for driving either one of said upper and lower aprons close to or apart from the other of said upper and lower aprons;

means for calculating a theoretical D value indicating a theoretical engagement positional relationship between said upper tool and said lower die that corresponds to a target bending angle according to workpiece infomation, die information, and bending information;

means for bending said workpiece while controlling said engagement positional relationship between said upper tool and said lower die according to said theoretical D value;

means for measuring bending angles of said workpiece at a plurality of positions after said bending and calculating a mean value of said bending angles;

means for calculating a theoretical load value for bending said workpiece at said mean value of said bending angles and calculating a theoretical mechanical deflection value based on said theoretical load value;

means for detecting actual pressures applied on said drive means during said bending of said workpiece;

means for calculating an actual mechanical deflection value based on said actual pressure; and means for calculating a correction value for said theoretical D value according to a difference between said theoretical mechanical deflection value and said actual mechanical deflection value.

8. A press brake for bending a workpiece by controlling an engagement positional relationship between an upper tool and a lower die, said press brake comprising;

an upper apron having said upper tool installed thereon;

a lower apron having said lower die installed thereon;

drive means for driving either one of said upper and lower aprons close to or apart from the other of said upper and lower aprons;

crowning cylinders arranged under said lower apron to compensate for a downward curve during said bending, means for calculating a theoretical D value indicating a theoretical engagement positional relationship between said upper tool and said lower die that corresponds to a target bending angle according to workpiece information, die information and bending information;

means for bending said workpiece while controlling said engagement positional relationship between said upper tool and said lower die according to said theoretical D value;

means for measuring bending angles of said workpiece at a plurality of positions after said bending and calculating a mean value of said bending angles;

means for calculating a theoretical load value for bending said workpiece at said mean value of said bending angles and calculating a theoretical mechanical deflection value based on said theoretical load value;

means for detecting actual pressure applied on said drive means during said bending of said workpiece;

means for calculating an actual mechanical deflection value based on said actual pressure;

means for calculating a difference between said theoretical mechanical deflection value and said actual mechanical deflection value;

means for calculating an amount of deflection at a plurality of positions in a longitudinal direction of said lower apron in said press brake and converting said amount of deflection at said plurality of positions bending angles at a plurality of corresponding positions of said workpiece;

means for calculating pressures to be applied on said crowning cylinders in said lower apron according to said calculated bending angles at said plurality of corresponding positions;

means for calculating bending angles of both sides of said workpiece which are bent by applying said calculated pressure to said crowning cylinders and calculating a correction value for said D value according to said calculated bending angles; and means for calculating an instructive value according to said correction value for said theoretical D value and said theoretical D value and controlling said engagement positional relationship between said upper tool and said lower die according to said instructive value to perform said bending of said workpiece.

9. A press brake in which a sheet-shaped workpiece is pinched between an upper tool and a lower die while an engagement positional relationship between said upper tool and said lower die is controlled to perform bending said workpiece, said press brake comprising:

an upper apron having said upper tool installed thereon:

a lower apron having said lower die installed thereon;

drive means for driving either one of said upper and lower aprons close to or apart from the other of said upper and lower aprons;

means for calculating a theoretical D value indicating a theoretical engagement positional relationship between said upper tool and said lower die that corresponds to a target bending angle according to workpiece information, die information and bending information;

means for calculating a theoretical load value according to said workpiece information, die information and bending information and calculating a theoretical mechanical deflection value according to said theoretical load value;

means for calculating an instructive D value indicating said engagement positional relationship between said upper tool and said lower die according to said theoretical D value and a theoretical mechanical deflection value and performing bending said workpiece according to said instructive D value;

means for measuring bending angles of said workpiece at a plurality of positions after said bending and calculating a mean value of said bending angles;

means for calculating a theoretical load value for bending said workpiece according to said mean value of said bending angles and calculating a theoretical mechanical deflection value based on said theoretical load value;

means for detecting actual pressure applied on said drive means during said bending of said workpiece;

means for calculating an actual mechanical deflection value based on said actual pressure;

means for calculating a correction value for said theoretical D value according to a difference between said theoretical mechanical deflection value and said actual mechanical deflection value; and means for correcting said engagement positional relationship between said upper tool and said lower die by adding said correction value to said instructive D value and performing said bending said workpiece again.

10. A press brake for bending a workpiece between a punch and a die by reciprocating at least one of an upper table and a lower table, said punch being provided on a bottom of said upper table and said die being provided on a top of said lower table and having a V-shaped groove, said press brake including a control unit for calculating and controlling a distance D from a bottom of said die to a tip of said punch, said control unit of said press brake comprising:

means for inputting bending information relating to said punch, said die and said workpiece;

means for determining whether said workpiece is winding around said tip of said punch in accordance with said bending information inputted into said input means;

means for calculating an amount of spring-back of said workpiece in accordance with a result by said workpiece winding determination means;

air bend/bottoming determination means for determining whether said workpiece is bent under air-bend condition or bottoming condition by said amount of spring-back and a target angle;

means for calculating a workpiece pinching angle when said air bend/bottoming determination means determines bending under said air-bend condition;

means for calculating pressure to be applied at said workpiece pinching angle calculated by said workpiece pinching angle calculating means; and means for calculating a position of one of said upper table and said lower table to be moved when said workpiece is pinched at said workpiece pinching angle.

11. The press brake according to claim 10, further comprising:

means for calculating a mechanical deflection of said press brake according to said pressure applied at said workpiece pinching angle; and means for calculating a final table position according to said position of said one of said upper table and said lower table to be moved and said mechanical deflection.

12. A press brake for bending a workpiece between a punch and a die by reciprocating at least one of an upper table and said lower table, said punch being provided on a top of said lower table and having a V-shaped groove, said press brake including a control unit for calculating and controlling a distance D from a bottom of said die to a tip of said punch, said control unit of said press brake comprising:

means for inputting bending information relating to said punch, said die and said workpiece;

means for determining whether said workpiece is winding around said tip of said punch in accordance with said bending information inputted into said input means;

means for calculating an amount of spring-back of said workpiece in accordance with a result by said workpiece winding determination means;

air bend/bottoming determination means for determining whether said workpiece is bent under air/bend condition or bottoming condition by said amount of spring-back and a target angle;

means for calculating a workpiece pinching angle when said air bend/bottoming determination means determines bending under said bottoming condition;

means for calculating pressure to be applied at said workpiece pinching angle calculated by said workpiece pinching angle calculating means;

means for calculating a first boundary load value between a bottoming area where said workpiece is bent under said bottoming condition and an air bend area where said workpiece is bent under said air bend condition, said first boundary load value existing on the side of said bottoming area;

means for calculating a second boundary load value between said bottoming area and said air bend area, said second boundary load value existing on the side of said air bend area;

means for calculating a load value required for said bottoming by shifting said first boundary load value to said boundary load value; and means for calculating a position of one of said upper table and said lower table to be moved when said workpiece is pinched at said workpiece pinching angle.

13. The press brake according to claim 12, further comprising:

means for calculating a mechanical deflection of said press brake according to said pressure applied at said workpiece pinching angle;

means for calculating a final table position according to said position of said one of said upper table and said lower table to be moved and said mechanical deflection.

* * * * *